(12) United States Patent
Hirai

(10) Patent No.: US 8,180,842 B2
(45) Date of Patent: May 15, 2012

(54) COMMUNICATION DEVICE MANAGEMENT PROGRAM

(75) Inventor: Koichi Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 948 days.

(21) Appl. No.: 11/014,680

(22) Filed: Dec. 16, 2004

(65) Prior Publication Data

US 2005/0141444 A1 Jun. 30, 2005

(30) Foreign Application Priority Data

Dec. 19, 2003 (JP) ................................ 2003-422942

(51) Int. Cl.
- *G06F 15/16* (2006.01)
- *G06F 15/173* (2006.01)
- *G06F 13/28* (2006.01)

(52) U.S. Cl. ........ 709/212; 709/219; 709/220; 709/221; 709/222; 709/223; 709/213; 709/214; 709/215; 709/216; 709/217; 709/225; 707/999.001; 707/999.002; 707/999.003; 707/999.004; 707/999.005; 707/999.006; 707/999.007; 707/999.008; 707/999.009; 707/999.01; 707/999.203; 707/999.204; 707/999.205; 711/147; 711/170; 711/152; 711/203

(58) Field of Classification Search .......... 709/219–223, 709/225, 212–217; 707/1–10, 203–205; 711/147, 170, 152, 203
See application file for complete search history.

(56) References Cited

U.S. PATENT DOCUMENTS

| | | | |
|---|---|---|---|
| 4,595,923 A | | 6/1986 | McFarland, Jr. |
| 4,930,069 A | | 5/1990 | Batra et al. |
| 5,293,029 A | * | 3/1994 | Iijima ............................ 235/380 |
| 5,317,568 A | * | 5/1994 | Bixby et al. .................. 370/401 |
| 5,418,913 A | * | 5/1995 | Fujimoto ...................... 709/213 |
| 5,497,472 A | * | 3/1996 | Yamamoto et al. ........... 711/100 |
| 5,537,569 A | * | 7/1996 | Masubuchi .................... 711/121 |
| 5,568,633 A | * | 10/1996 | Boudou et al. ................ 711/141 |

(Continued)

FOREIGN PATENT DOCUMENTS

JP 01-142963 A 6/1989

(Continued)

OTHER PUBLICATIONS

Office Action dated May 12, 2009, and issued by the Japanese Patent Office in corresponding Japanese Patent Application No. 2003-422942.

*Primary Examiner* — John Follansbee
*Assistant Examiner* — Saket K Daftuar
(74) *Attorney, Agent, or Firm* — Fujitsu Patent Center

(57) ABSTRACT

A communication device management program that enables efficient use of memory space in receiving data using remote direct memory access (RDMA) techniques. The receiving node transmits a virtual ID corresponding to a receiving process to a remote sending node. A sending process in the sending node specifies this virtual ID when starting data transmission. If the receiving node has not reserved a memory area corresponding to that virtual ID, the sending node transmits a reservation request to the receiving node, which causes a data receiving memory area to be reserved for use by a communication device in the receiving node. In the sending node, the sending communication device begins sending transmission data in RDMA mode, from a memory area managed by the sending process to the reserved data receiving memory area. The receiving communication device directs incoming transmission data to a memory area managed by the receiving process.

10 Claims, 29 Drawing Sheets

U.S. PATENT DOCUMENTS

| | | | |
|---|---|---|---|
| 5,842,226 A * | 11/1998 | Barton et al. | 711/203 |
| 5,944,794 A * | 8/1999 | Okamoto et al. | 709/225 |
| 6,081,874 A * | 6/2000 | Carpenter et al. | 711/141 |
| 6,085,029 A * | 7/2000 | Kolawa et al. | 714/38 |
| 6,085,238 A * | 7/2000 | Yuasa et al. | 709/223 |
| 6,430,607 B1 * | 8/2002 | Kavner | 709/217 |
| 6,453,334 B1 * | 9/2002 | Vinson et al. | 709/203 |
| 6,480,940 B1 * | 11/2002 | Aino | 711/141 |
| 6,519,634 B1 * | 2/2003 | Song et al. | 709/220 |
| 6,856,619 B1 * | 2/2005 | Haugseth et al. | 370/389 |
| 6,948,101 B2 * | 9/2005 | Saito | 714/43 |
| 6,970,912 B2 * | 11/2005 | Murayama et al. | 709/216 |
| 7,007,049 B2 * | 2/2006 | Peng | 707/205 |
| 7,349,956 B2 * | 3/2008 | Anderson et al. | 709/219 |
| 7,366,853 B2 * | 4/2008 | Honda et al. | 711/156 |
| 2001/0010061 A1 * | 7/2001 | Matsumoto | 709/249 |
| 2002/0184529 A1 * | 12/2002 | Foster et al. | 713/201 |
| 2003/0037178 A1 * | 2/2003 | Vessey et al. | 709/319 |
| 2003/0126430 A1 * | 7/2003 | Shimada et al. | 713/155 |
| 2003/0200231 A1 * | 10/2003 | Deguchi et al. | 707/200 |
| 2003/0212805 A1 * | 11/2003 | Motosaka et al. | 709/228 |
| 2004/0004966 A1 * | 1/2004 | Foster et al. | 370/399 |
| 2004/0010618 A1 * | 1/2004 | Thomas | 709/245 |
| 2004/0098427 A1 * | 5/2004 | Peng | 707/205 |
| 2004/0103261 A1 * | 5/2004 | Honda et al. | 711/202 |
| 2004/0250021 A1 * | 12/2004 | Honda et al. | 711/114 |
| 2004/0260861 A1 * | 12/2004 | Serizawa et al. | 711/4 |
| 2005/0021562 A1 * | 1/2005 | Idei et al. | 707/104.1 |
| 2005/0091272 A1 * | 4/2005 | Smith et al. | 707/104.1 |
| 2005/0132249 A1 * | 6/2005 | Burton et al. | 714/5 |
| 2006/0200671 A1 * | 9/2006 | Ishigaki et al. | 713/176 |

FOREIGN PATENT DOCUMENTS

| | | |
|---|---|---|
| JP | 03-40014 A | 2/1991 |
| JP | 05-143497 A | 6/1993 |
| JP | 07-225728 A | 8/1995 |
| JP | 08-16501 A | 1/1996 |
| JP | 2002-351817 | 12/2002 |

* cited by examiner

COMMUNICATION DEVICE MANAGEMENT PROGRAM

CROSS-REFERENCE TO RELATED APPLICATIONS

This application is based upon and claims the benefits of priority from the prior Japanese Patent Application No. 2003-422942, filed on Dec. 19, 2003, the entire contents of which are incorporated herein by reference.

BACKGROUND OF THE INVENTION

1. Field of the Invention

The present invention relates to a communication device management program, a communication device management method, and a communication management device with direct access functions, and more particularly, to a communication device management program, a communication device management method, and a communication management device capable of efficiently and directly accessing a remote node memory in a large-scale network system.

2. Description of the Related Art

In a large-scale computer network, a plurality of servers operate in cooperation with each other to provide a high-level data processing service to the users. In such a system, data transmission among the servers via a network takes place frequently. Therefore, to increase the processing capacity of the entire system, further efficient data transmission is indispensable.

FIG. 28 shows a conventional data transmission method. As shown in FIG. 28, a computer 910 and a computer 920 are connected to each other via a communication medium 930.

In the computer 910, a user application 911 and a communication device manager 912 are installed as software modules. A memory area 911a and a memory area 912a in a memory space are allocated to the user application 911 and the communication device manager 912, respectively. Also, the computer 910 is connected to the communication medium 930 via a communication device 913.

Similarly, in the computer 920, a user application 921 and a communication device manager 922 are installed as software modules. A memory area 921a and a memory area 922a in a memory space are allocated to the user application 921 and the communication device manager 922, respectively. Also, the computer 920 is connected to the communication medium 930 via a communication device 923.

Here, the sequence of data transmission in the case where the data transmission is made from the user application 911 in the computer 910 to the user application 921 in the computer 920 will be described below.

In the computer 910 at the transmitting end, the user application 911 outputs a transmission request to the communication device manager 912. The communication device manager 912 copies data from the memory area 911a of the user application to a storage medium corresponding to the memory area 912a managed by the communication device manager 912 itself. Then, the communication device manager 912 generates a packet including the data in the memory area 912a, and transmits the packet to the communication device 913. The communication device 913 transmits the received packet to the computer 920 via the communication medium 930.

In the computer 920 at the receiving end, the user application 921 outputs a reception request to the communication device manager 922, and the communication device 923 receives the packet sent via the communication medium 930. The communication device 923 transmits the received packet to the communication device manager 922. The communication device manager 922 stores the data included in the received packet in a storage medium corresponding to the memory area 922a of its own. Then, the communication device manager 922 copies the data in the memory area 922a to the memory area 921a in the user application 921. For an example of this type of data transmission, refer to W Richard Stevens "UNIX Network Programming: Second Edition Vol. 1" Piason Education, Jul. 30, 1999, pp. 48-49.

As described above, the conventional data transmission method requires data buffering tasks and data copying tasks at both ends of the transmission path. Such copying processes as described above are one of the factors that reduce the processing efficiency of entire data transmission. Therefore, in order to increase the processing efficiency of data transmission, a data transmission method that does not require data copying has been proposed. This method is called "zero-copy transmission."

To implement zero-copy transmission, a communication device that has an RDMA (Remote Direct Memory Access) function with hardware assist is employed.

FIG. 29 shows a data transmission method using RDMA. As shown in FIG. 29, a computer 940 and a computer 950 are connected via a communication medium 960.

In the computer 940, a user application 941 and a communication device manager 942 are installed as software modules. In the user application 941, a memory area 941a is allocated in the address space. Also, the computer 940 is connected to the communication medium 960 via a communication device 943.

Similarly, in the computer 950, a user application 951 and a communication device manager 952 are installed as software modules. In the user application 951, a memory area 951a is allocated in the address space. Also, the computer 950 is connected to the communication medium 960 via a communication device 953.

Here, a sequence of data transmission from the user application 941 in the computer 940 to the user application 951 in the computer 950 will be described below.

In the computer 940 at the transmitting end, the user application 941 outputs a transmission request to the communication device manager 942. The communication device manager 942 gives an instruction of RDMA transmission to the communication device 943, and transmits data from the memory area 941a in the user application to the communication device 943. The communication device manager 942 transmits the received data to the communication device 943 using RDMA. The communication device 943 transmits the received data to the computer 950 via the communication medium 960, specifying an I/O address of the computer 950.

In the computer 950, the user application 951 outputs a reception request to the communication device manager 952, and the communication device 953 receives the data sent using RDMA transmission via the communication medium 960. The communication device 953 transmits the received data to the memory area 951a in the user application 951.

As described above, when the communication devices 943 and 953 having RDMA functions are employed, data transmission can be carried out via the communication medium 960 without data copying within either of the computers 940 and 950. Moreover, an access check technique for checking whether RDMA is done properly has been proposed (for example, refer to Japanese Unexamined Patent Publication No. 2002-351817).

In the conventional RDMA transmission, transmission has to be carried out while taking into consideration the memory area etc. at the receiving end. That is to say, before starting RDMA transmission, a sufficient memory area according to the data to be transmitted has to be reserved in the memory space at the data receiving end, and the application on each server has to recognize the address of that memory area. If the reservation processing described above should be carried out each time a transmission begins, the processing efficiency of services provided cooperatively by the servers would be reduced. To avoid this problem, the receiving computer has to reserve memory areas beforehand in preparation for receiving data from each remote computer.

However, it is wasteful to keep such memory areas even when there is no data transmission. Particularly, in the case where data transmission is carried out from many servers, the memory area for data transmission has to be reserved for each server. Accordingly, the memory area within the memory space may run out in the worst-case scenario.

For example, even in a computer with a virtual memory space, only part of the virtual memory space can be used for data transmission. Further, if the size of the data to be transmitted is large, an equally large memory area has to be reserved. Therefore, in a server that receives data transmitted from plural computers, it is, not practical to reserve a memory area for each computer connected therewith.

SUMMARY OF THE INVENTION

The present invention has been proposed in view of the above-described problems. An object of the present invention is to provide a communication device management program capable of increasing the application efficiency of the memory space used for RDMA transmission.

In order to achieve the above-mentioned object, a communication device management program for managing data receiving process by a communication device is provided. The communication device management program causes a computer to execute the following steps: (a) transmitting to a remote node a virtual ID corresponding to a process of acquiring data from the remote node via a network; (b) reserving a data receiving memory area of the communication device in a memory space upon receipt of an address acquisition request with the specified virtual ID from the remote node; (c) storing a record of association between the virtual ID and the data receiving memory area in a storage device; (d) notifying the remote node of the reserved data receiving memory area; and (e) consulting the record stored in the storage device to identify the process corresponding to the data receiving memory area specified by the remote node, and outputting a store instruction to the communication device to store transmission data from the remote node into a memory area managed by the identified process.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Outline of the invention will be described first and then, particular embodiments will be described.

Figure 1:
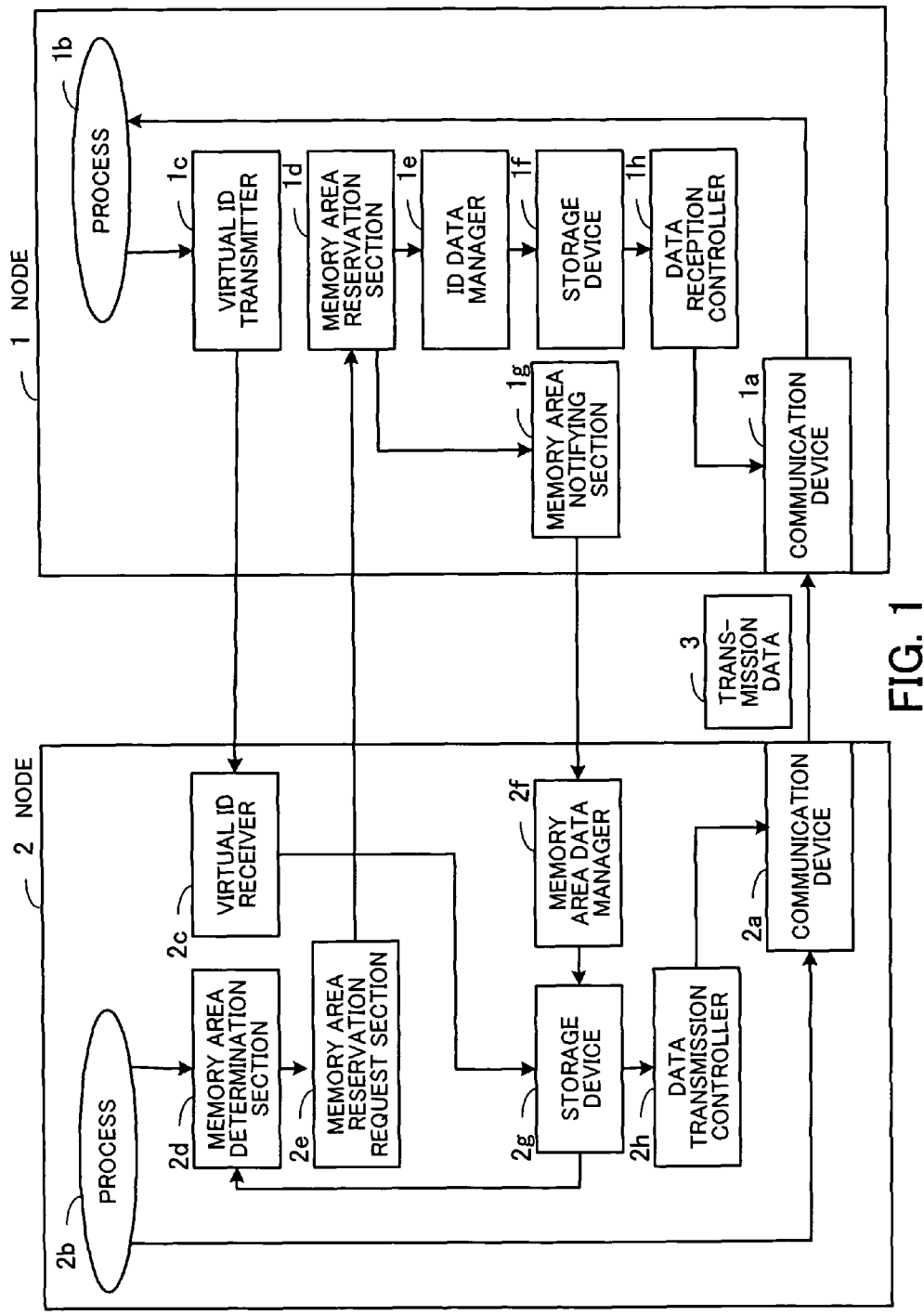
FIG. 1 is a schematic diagram of the invention applied to embodiments.

FIG. 1 is a schematic diagram of the invention. In the example in FIG. 1, data are transferred from a node 2 to a node 1 using RDMA techniques.

The node 1 has a communication device 1a that supports RDMA functions. Also, in the node 1, a process 1b is running to receive data via a network. Further, in order to manage the data receiving process with the communication device 1a, the node 1 comprises a virtual identifier (ID) transmitter 1c, a memory area reservation section 1d, an ID data manager 1e, a storage device if, a memory area notifying section 1g, and a data reception controller 1h.

The virtual ID transmitter 1c transmits a virtual ID corresponding to the process 1b to a remote node. The memory area reservation section 1d reserves a data receiving memory area in the memory space for use by the communication device 1a upon receipt of an address acquisition request with the specified virtual ID from the remote node. The ID data manager 1e stores ID management data in the storage device if to record an association between the virtual ID and the data receiving memory area. The memory area notifying section 1g notifies the remote node of the reserved data receiving memory area. Upon receipt of transmission data 3 with a data receiving memory area from the remote node, the data reception controller 1h consults the record stored in the storage device if to identify the process 1b corresponding to the specified data receiving memory area, and outputs a store instruction to the communication device 1a to store the transmission data 3 in a memory area managed by the process 1b.

The node 2 has a communication device 2a that supports RDMA functions. Also, in the node 2, a process 2b is running to send data to a remote node via the network. The process 2b carries out data transmission to a specified memory address of a remote node. Further, in order to manage the data transmission processing with the communication device 2a, the node 2 comprises a virtual ID receiver 2c, a memory area determination section 2d, a memory area reservation request section 2e, a memory area data manager 2f, a storage device 2g and a data transmission controller 2h.

The virtual ID receiver 2c receives a virtual ID from a connected remote node via the network and stores a record of the received virtual ID in the storage device 2g. Upon receipt of a transmission request with a specified virtual ID from the process 2b, the memory area determination section 2d consults the record in the storage device 2g to determine whether the remote node has a reserved data receiving memory area corresponding to the specified virtual ID. When the required memory area has not been reserved, the memory area reservation request section 2e transmits a reservation request for a data receiving memory area to the remote node. Upon receipt of a reservation response that indicates a range of the reserved data receiving memory area from the remote node, the memory area data manager 2f associates the data indicating the memory area with the virtual ID and stores a record of this information in the storage device 2g. The data transmission controller 2h consults the record stored in the storage device 2g to determine the data receiving memory area corresponding to the virtual ID specified by the transmission request, and outputs a data transmission instruction with the specified data receiving memory area to the communication device 2a, so that transmission data in a memory area managed by the process 2b will be delivered to the remote node.

The following processing is carried out by the system described above.

First of all, the virtual ID transmitter 1c in the receiving node 1 transmits a virtual ID corresponding to the process 1b to the remote sending node 2. The virtual ID receiver 2c in the node 2 receives the transmitted virtual ID and stores the virtual ID in the storage device 2g.

The sending process 2b now issues a transmission request, specifying the virtual ID of the receiving process 1b. The memory area determination section 2d then determines whether the receiving node 1 has a reserved data receiving memory area corresponding to the specified virtual ID. When the required memory area has not been reserved, the memory area reservation request section 2e transmits a reservation request for a data receiving memory area to the receiving node 1.

In the node 1, upon receipt of the address acquisition request with the specified virtual ID, the memory area reservation section 1d reserves the requested data receiving memory area of the communication device 1a in the memory space. The ID data manager 1e stores a record of association between the virtual ID and the reserved data receiving memory area into the storage device 1f. Further, the memory area notifying section 1g notifies the requesting node 2 of the reserved data receiving memory area.

In the node 2, upon receipt of a reservation response that indicates the range of the reserved data receiving memory area from the node 1, the memory area data manager 2f stores the received data in the storage device 2g together with the associated virtual ID. Then, the data transmission controller 2h consults that information stored in the storage device 2g to determine the data receiving memory area that corresponds to the virtual ID specified by the transmission request and outputs a data transmission instruction to the communication device 2a. This instruction specifies data transmission from a memory area managed by the sending process 2b to the data receiving memory area in the node 1. Then, the communication device 2a begins to send transmission data 3 using its RDMA transmission function.

In the receiving node 1, upon receipt of the transmission data 3 with the specified data receiving memory area from the sending node 2, the data reception controller 1h consults the storage device 1f to identify the process 1b corresponding to the data receiving memory area and outputs a store instruction of the transmission data 3 to the memory area managed by the process 1b to the communication device 1a. Then, the communication device 1a stores the transmission data 3 in the memory area managed by the process 1b.

As can be seen from the above, the receiving node is arranged so that a data receiving memory area is reserved in response to a reservation request from a remote node. Accordingly, it is not necessary to reserve such memory areas in advance for each remote node, and thus the memory space can be used effectively.

Further, by providing the receiving node 1 with a memory area releasing section for releasing the data receiving memory area not in use for the data transmission, it is possible to prevent the data receiving memory area not in use from being kept reserved in the memory space for a long period of time.

Further, when the memory area reservation section 1d detects an occurrence of failure during the period of data transmission using the data receiving memory area reserved in the communication device 1a, the data receiving memory area can be reserved again in the memory space. With this feature, the process can continue the data transmission stably without the need for considering failure in the communication path.

Particular embodiments of the present invention will now be described below.

Figure 2:
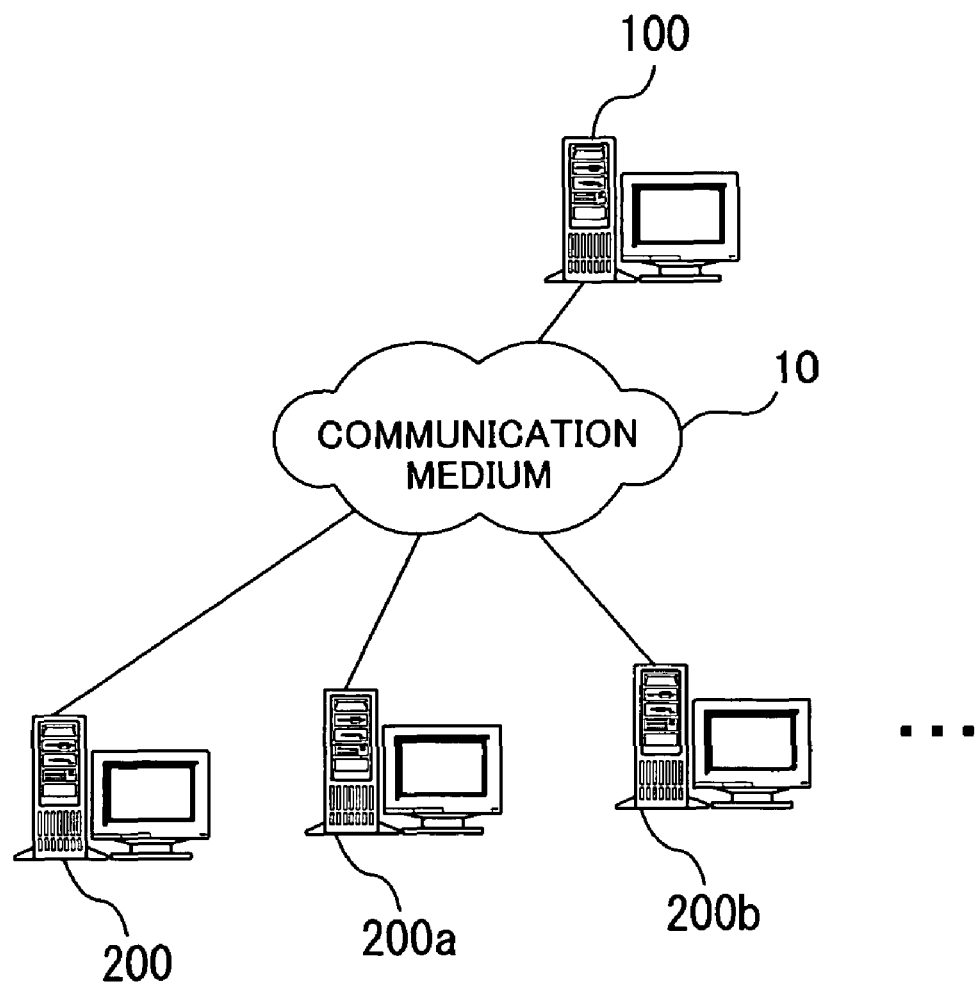
FIG. 2 shows a network system according to an embodiment of the present invention.

FIG. 2 shows a network system according to an embodiment of the present invention. In the network system, a plurality of nodes 100, 200, 200a, 200b, . . . are connected with each other via a communication medium 10. The communication medium 10 employs, for example, an interface technique called InfiniBand™. Each of the nodes 100, 200, 200a, 200b, . . . performs a variety of processes in cooperation with each other.

Each of the nodes 100, 200, 200a, 200b, . . . performs transmission and reception of data with each other via the communication medium 10. Since the data transmission is required to be carried out at a high speed, zero-copy transmission is carried out. In this case, if the respective nodes 100, 200, 200a, 200b, . . . prepare respective I/O addresses for each of the other nodes, their memory space would be exhausted. Therefore, this embodiment is directed to more efficient use of I/O address space during data transmission.

Figure 3:
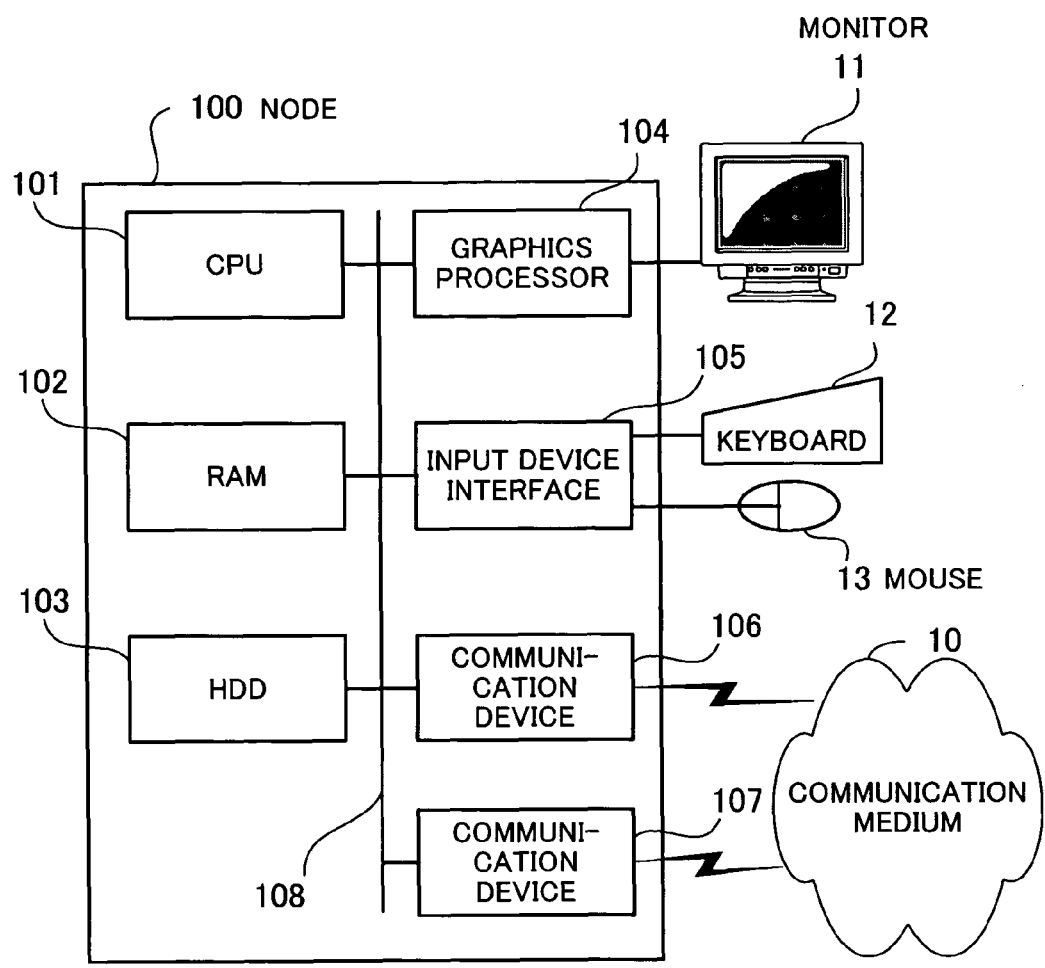
FIG. 3 shows an example of configuration of hardware in a computer used in the embodiment of the present invention.

FIG. 3 shows an example of a configuration of hardware of a computer used in the embodiment of the present invention. In the node 100, a CPU (Central Processing Unit) 101 controls the entire apparatus. Connected to the CPU 101 via a bus 108 are a RAM (Random Access Memory) 102, a hard disk drive (HDD) 103, a graphics processor 104, an input device interface 105 and communication devices 106 and 107.

In the RAM 102, at least part of OS (Operating System) programs and application programs, which are executed by the CPU 101, is temporarily stored. Also, in the RAM 102, various kinds of data necessary for processing by the CPU 101 are stored. In the HDD 103, the OS and the application programs are stored.

Connected to the graphics processor 104 is a monitor 11. The graphics processor 104 displays images on the screen of the monitor 11 in accordance with instructions from the CPU 101. Connected to the input device interface 105 are a keyboard 12 and a mouse 13. The input device interface 105 transmits the signals sent from the keyboard 12 and the mouse 13 to the CPU 101 via the bus 108.

The communication devices 106 and 107 are connected to the communication medium 10. The communication devices 106 and 107 perform transmission and reception of data with other nodes via the communication medium 10. Further, the communication devices 106 and 107 have RDMA data transmission functions. That is, when transmitting data, the communication devices 106 and 107 can specify the I/O address of the remote node. Further, when the communication devices 106 and 107 receive data specified with the I/O address of its own, the communication devices 106 and 107 convert the I/O address into an address of a memory area managed by the user application (determined based on the virtual ID), which is the destination of the data. Still further, the communication devices 106 and 107 can write the received data directly in the memory area of the user application.

The processing functions of this embodiment can be implemented with the above-described hardware configuration. While FIG. 3 shows the node 100, the same hardware configuration can also be applied to the other nodes 200, 200a, 200b, and so on.

Figure 4:
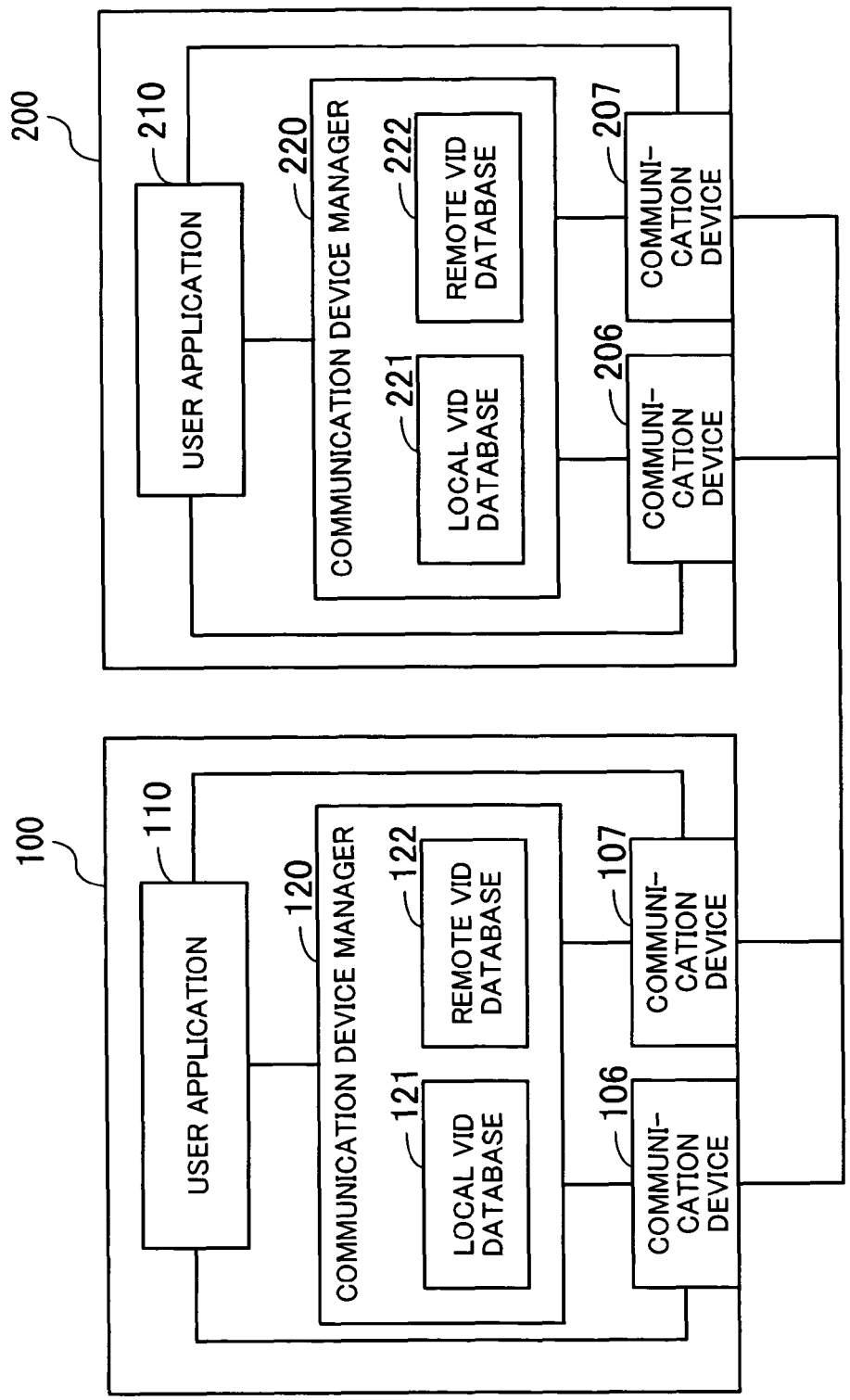
FIG. 4 shows a functional configuration in a node.

FIG. 4 shows a functional configuration of nodes. In the node 100, a user application 110 and a communication device manager 120 are installed as software modules. The user application 110 and the communication device manager 120 operate as computer processes running on the node 100. The user application 110 provides various kinds of data processing services such as database server functions.

The communication device manager 120 manages the operation of the communication devices 106 and 107. The communication device manager 120 is installed as, for example, a device driver. The communication device manager 120 comprises a local virtual ID (VID) database 121 and a remote VID database 122. In the local VID database 121, the association between I/O addresses of the local communication devices 106 and 107 and their virtual IDs is registered. In the remote VID database 122, the association between an IP address of the remote node and its virtual ID is registered. The local VID database 121 and the remote VID database 122 are stored in a storage device such as the RAM 102 or HDD 103.

Similarly, in the node 200, a user application 210 and a communication device manager 220 are installed as software modules. The user application 210 and the communication device manager 220 operate as computer processes running on the node 200. The communication device manager 220 manages the operation of communication devices 206 and 207. The communication device manager 220 comprises a local VID database 221 and a remote VID database 222. In the local VID database 221, the association between I/O addresses of the local communication devices 206 and 207 and their virtual IDs is registered. In the remote VID database 222, the association between an IP address of the remote node and its virtual ID is registered. The local VID database 221 and the remote VID database 222 are stored in a storage device such as the RAM or HDD.

Figure 5:
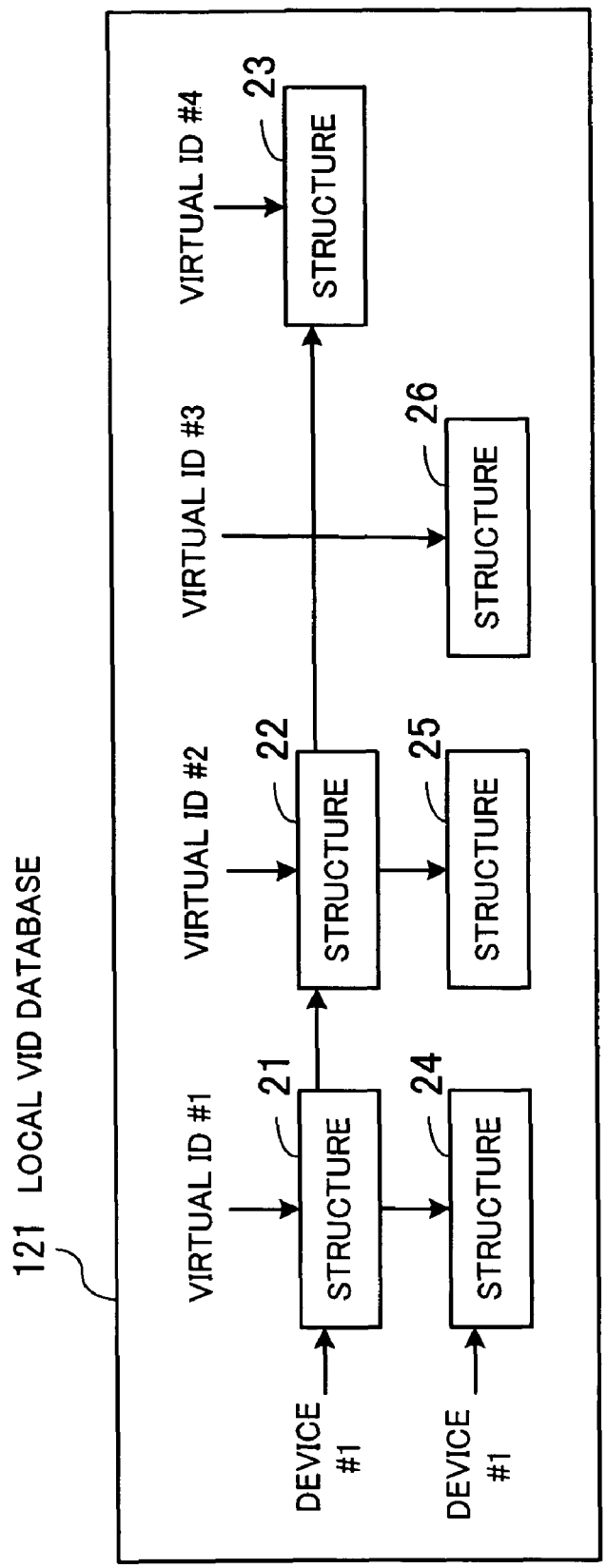
FIG. 5 shows an example of a data structure of local virtual ID database.

FIG. 5 shows an example of data structure of the local VID database. As shown in FIG. 5, the local VID database 121 is formed in a two-dimensional list. That is, in the local VID database 121, structures 21 to 26 are arranged two-dimensionally to represent various combinations of virtual IDs and communication IDs. Each virtual ID is uniquely associated with the memory area of a user application.

Figure 6:
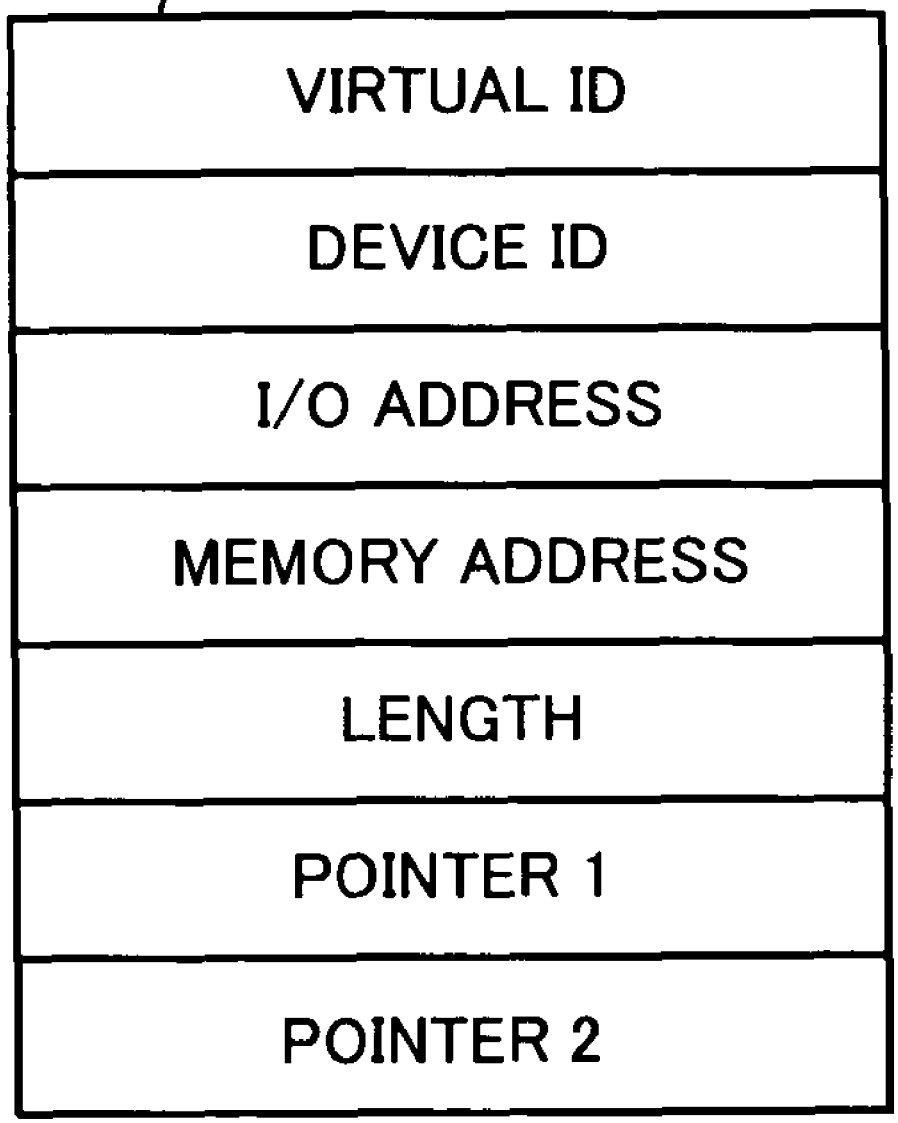
FIG. 6 shows the contents of a structure of the local virtual ID database.

FIG. 6 shows the contents of a structure in the local VID database. The structure 21 is formed from the following data fields: virtual ID, device ID, I/O address, memory address, length, pointer 1, and pointer 2.

The virtual ID field includes a virtual ID with which the structure 21 is associated. The device ID field includes an ID of the communication device with which the structure 21 is associated. The I/O address field includes an address of a memory area for receiving data of communication device associated with the structure 21.

The memory address field includes a beginning address of a memory area managed by a user application associated with the structure 21. Here, in the case where the node 100 is a computer with a virtual memory space, the wording "memory area managed by a user application" means a part of the area within the virtual memory space allocated to the process of the user application. The OS manages the association between the memory area and an address in the physical memory (RAM 102).

The length field includes a size of the memory area managed by the user application. In the pointer 1 field, a pointer that indicates the position of a structure associated with the next virtual ID in the two-dimensional list structure in the local VID database 121 is registered. In the pointer 2 field, a pointer that indicates the position of a structure of the next communication device in the two-dimensional list structure in the local VID database 121 is registered.

Figure 7:
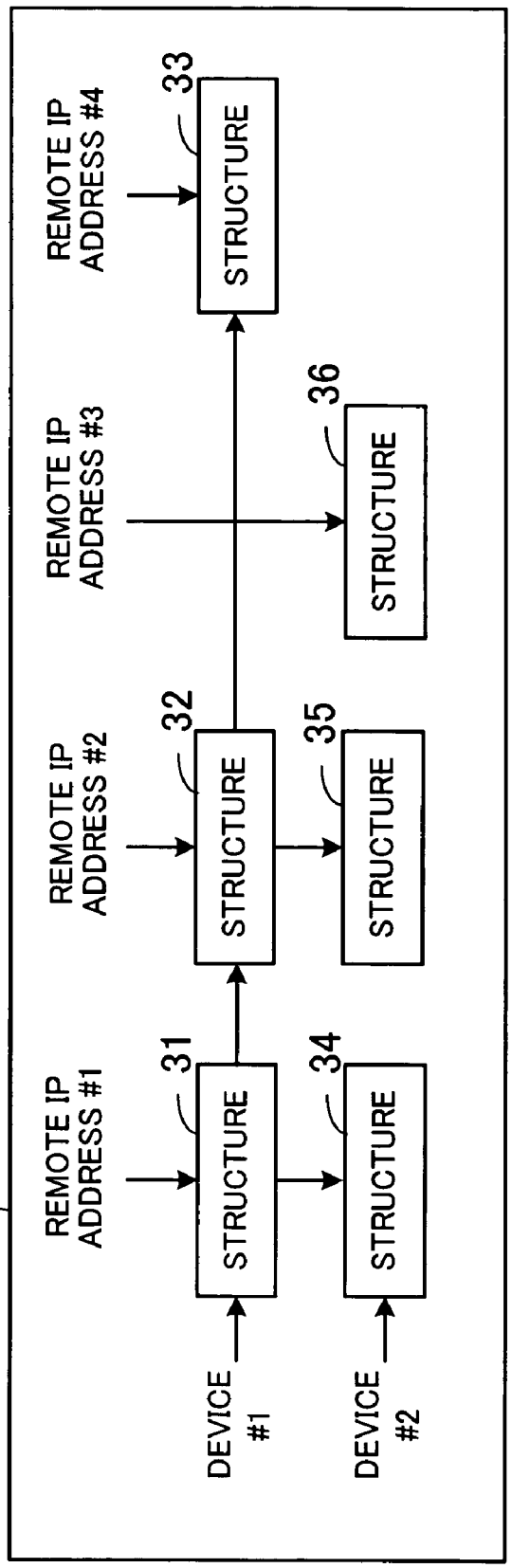
FIG. 7 shows an example of a data structure of remote virtual ID database.

FIG. 7 shows an example of data structure of the remote VID database. As shown in FIG. 7, the structure of data of the remote VID database 122 has a form of two-dimensional list. That is, in the remote VID database 122, structures 31 to 36 are each registered in association with a combination of a particular virtual ID and a particular communication device ID.

Figure 8:
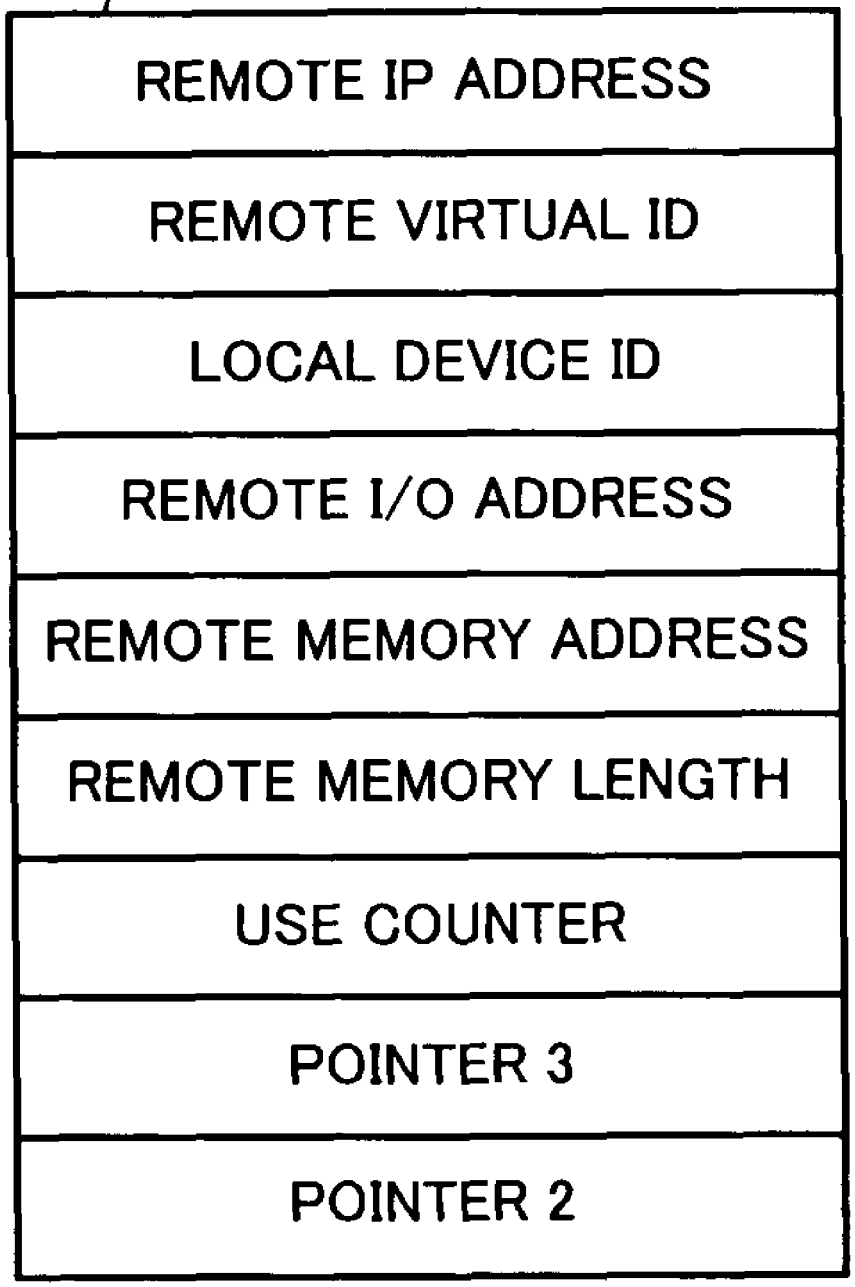
FIG. 8 shows the contents of a structure of the remote virtual ID database.

FIG. 8 shows the contents of a structure of the local VID database. The structure 31 includes the following data fields: remote IP address, remote virtual ID, local device ID, remote I/O address, remote memory address, remote memory length, use counter, pointer 3, and pointer 2.

The remote IP address field includes a remote IP address associated with the structure 31. The remote virtual ID field includes a virtual ID defined by a node relevant to the remote IP address associated with the structure 31. The local device ID field includes an ID of a communication device associated with the structure 31. The remote I/O address field includes a beginning address of an I/O memory area allocated to the remote virtual ID. The remote memory address field includes a beginning address of a memory area managed by the user application of the remote node. The remote memory length field includes a size of a memory area managed by the user application of the remote node.

The use counter field includes a counter indicating the number of executed data transmission processes. When data transmission on a communication path indicated by the structure 31 is started, the use counter is incremented by one, and is decremented by one when the data transmission is completed. When the value of the use counter is "0," it means that no data transmission is being executed on the communication path indicated by the structure 31.

In the pointer 3 field, a pointer that indicates the position of a structure of the next remote address in the two-dimensional list structure in the remote VID database 122 is registered. In the pointer 2 field, a pointer that indicates the position of a structure of the next communication device in the two-dimensional list structure in the local VID database 121 is registered.

Next, taking a case where data are transmitted from the node 200 to the node 100 as an example, the sequence of data transmission will be described below. Before carrying out data transmission, acquiring processing of a virtual ID is carried out as a preparatory step.

Figure 9:
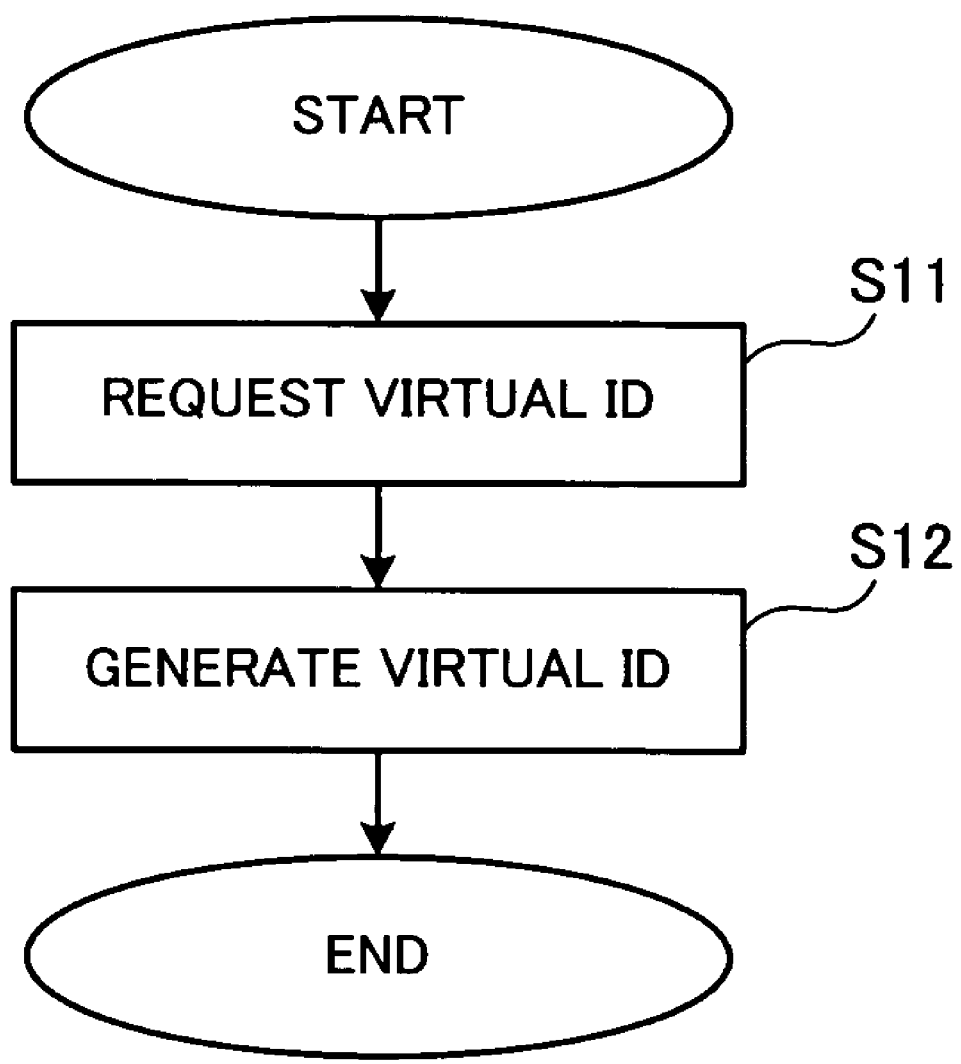
FIG. 9 is a flowchart showing acquiring processing of a virtual ID.

FIG. 9 is a flowchart showing acquiring processing of a virtual ID. The processing shown in FIG. 9 will be described as the processing in the node 100 in accordance with the step numbers.

[Step S11] An acquisition request of a virtual ID is issued to the communication device manager 120 from the user application 110.

[Step S12] The communication device manager 120 generates a new virtual ID and registers the ID in the local VID database 121. Then, the communication device manager 120 transfers the generated virtual ID to the user application 110. In this way, the user application 110 acquires the virtual ID.

The virtual ID acquiring processing is carried out also in the node 200 in the same manner as described above.

Figure 10:
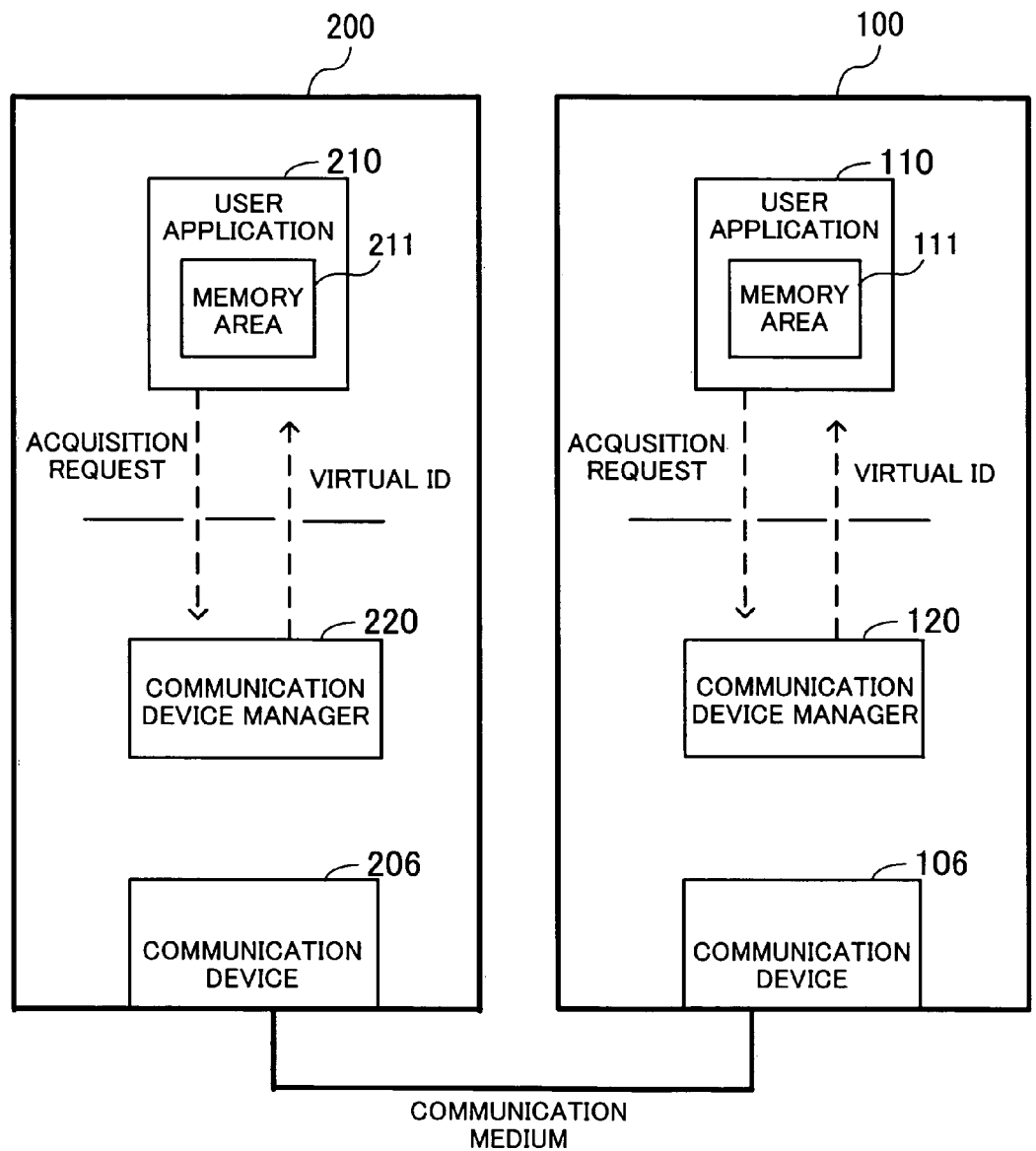
FIG. 10 shows the virtual ID acquiring processing.

FIG. 10 shows the virtual ID acquiring processing. Specifically, an acquisition request for a virtual ID is issued from the user application 110 to the communication device manager 120, and a virtual ID is returned from the communication device manager 120 to the user application 110. Similarly, an acquisition request for a virtual ID is issued from the user application 210 to the communication device manager 220, and a virtual ID is returned from the communication device manager 220 to the user application 210.

After this, when transmitting data from the user application 210 in the node 200 to the user application 110 in the node 100, the I/O addresses of the communication devices 106 and 107 in the node 100 are acquired by the node 200.

Figure 11:
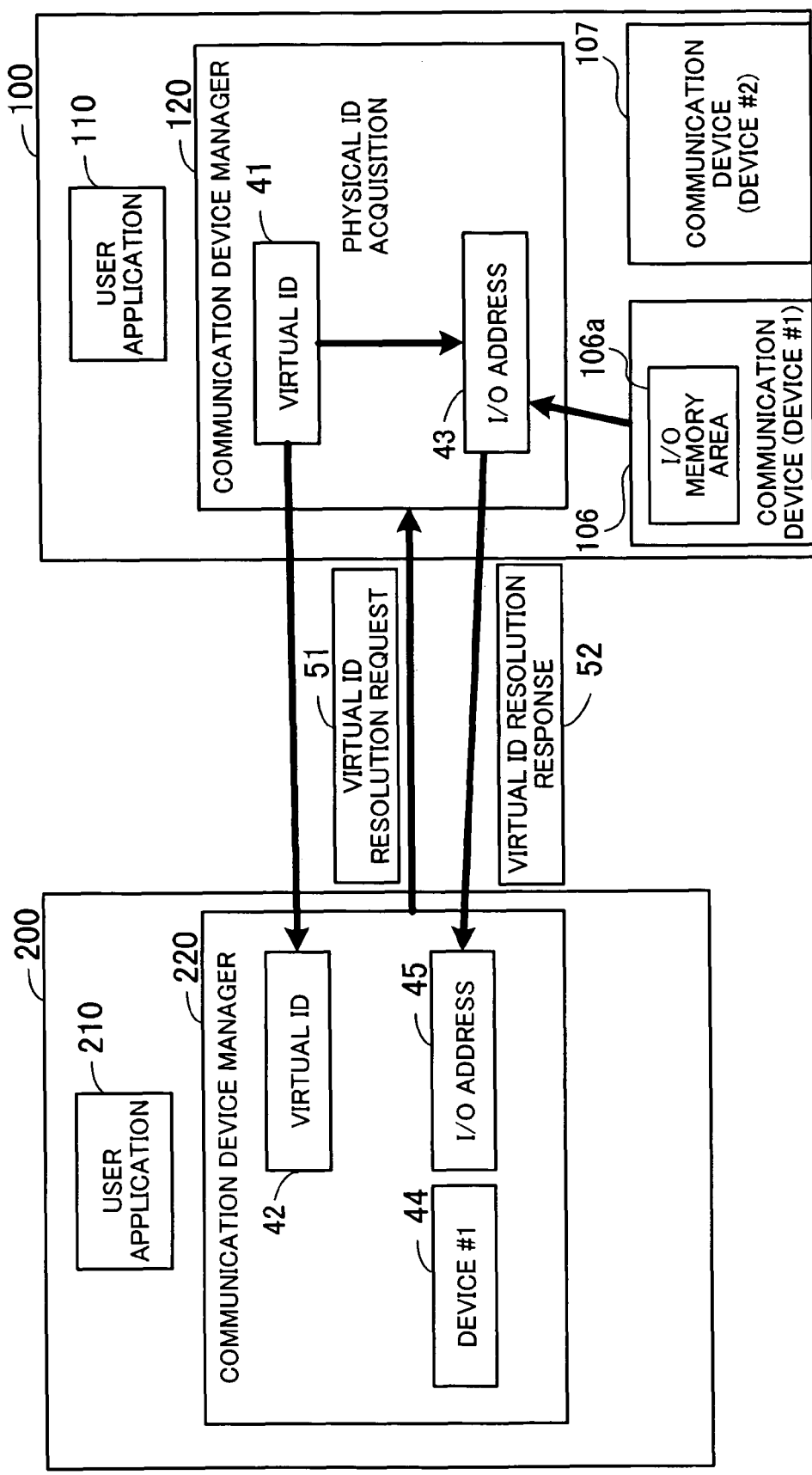
FIG. 11 is a schematic diagram showing I/O address acquiring processing.

FIG. 11 is a schematic diagram showing the I/O address acquiring processing. Here, it is assumed that the device ID of the communication device 106 in the node 100 is "device #1" and the device ID of the communication device 107 is "device #2."

The communication device manager 120 in the node 100 transmits a virtual ID 41 generated for the user application 110 to the communication device manager 220 in the node 200. Then, the communication device manager 220 in the node 200 holds the received virtual ID 41. Specifically, the virtual ID 41 is registered in the remote VID database 222 in the communication device manager 220. In this status, any physical ID (I/o address) corresponding to a virtual ID 42 is not registered yet.

Next, a virtual ID resolution request 51 relevant to the virtual ID 42 is transmitted from the communication device manager 220 in the node 200 to the communication device manager 120 in the node 100. Then, in the communication device manager 120, the physical ID (I/O address) of the communication device 106 is acquired.

Specifically, the communication device manager 120 reserves an I/O memory area 106a for the communication device 106 in the address space. Further, the communication device manager 120 associates the I/O address of the I/O memory area 106a with the virtual ID 41. Then, the communication device manager 120 transmits the device ID "device #1" of the communication device 106 and an I/O address 43 as a virtual ID resolution response 52 to the node 200.

In the node 200, the communication device manager 220 receives the virtual ID resolution response 52. The communication device manager 220 holds a device ID 44 (device #1) of the communication device 106 and an I/O address 45 being associated with the virtual ID 42. Specifically, the communication device manager 220 registers the I/O address 45 corresponding to the combination of the virtual ID 42 and the device ID 44 (device #1) in the remote VID database 222.

Figure 12:
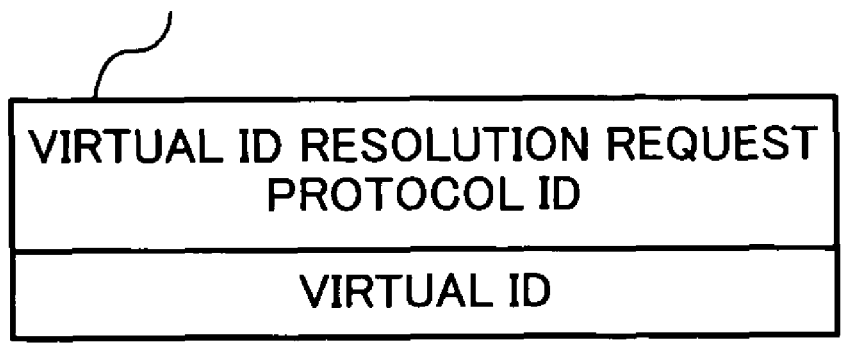
FIG. 12 shows an example of a data structure of a virtual ID resolution request.

FIG. 12 shows an example of a data structure of the virtual ID resolution request. The virtual ID resolution request 51 includes a virtual ID resolution request protocol ID and a virtual ID. The virtual ID resolution request protocol ID field includes a piece of data indicating that this is the virtual ID resolution request. The virtual ID field includes a virtual ID notified from the remote node.

Figure 13:
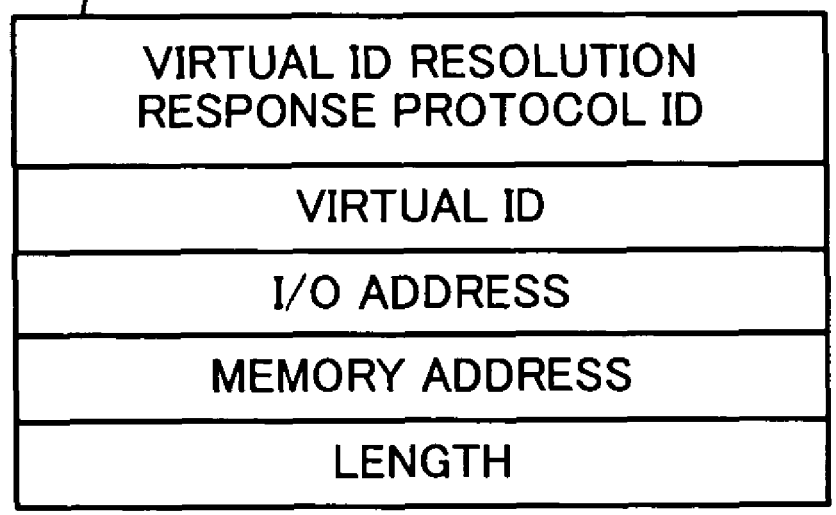
FIG. 13 shows an example of data structure of a virtual ID resolution response.

FIG. 13 shows an example of a data structure of the virtual ID resolution response. The virtual ID resolution response 52 includes a virtual ID resolution response protocol ID, a virtual ID, an I/O address, a memory address, and a length. The virtual ID resolution response protocol ID field includes a piece of data indicating that this is the virtual ID resolution response. The virtual ID field includes a virtual ID to which an I/O address is allocated. The I/O address field includes a beginning address of a reserved I/O memory area. The memory address field includes a memory address of the user application at the receiving end. The length field includes a data size of a reserved I/O memory area.

Thus, by acquiring an I/O address in the node at the transmitting end of the data, RDMA transmission with the specified I/O address is made possible.

Figure 14:
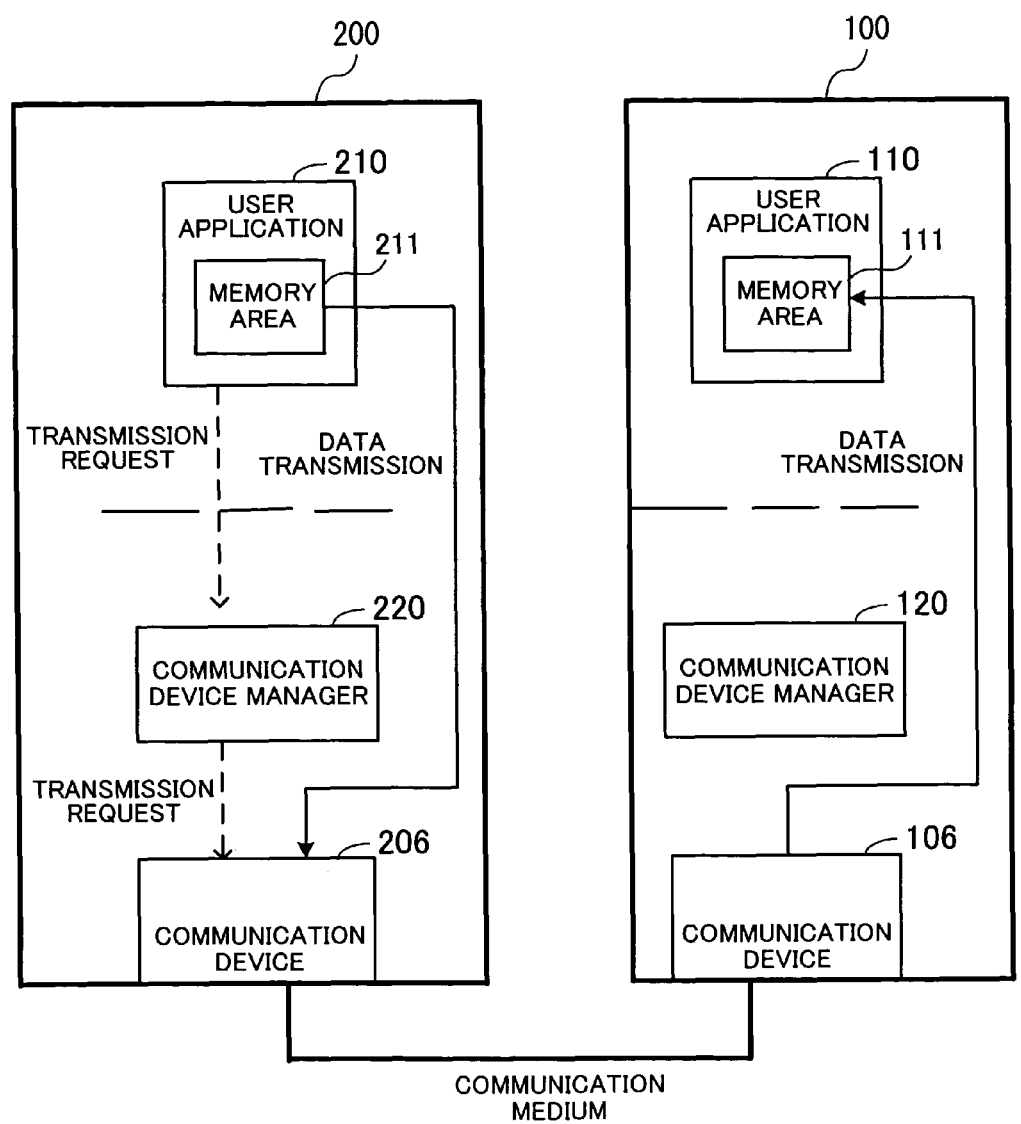
FIG. 14 shows a data transmission status.

FIG. 14 shows a data transmission status. First of all, a transmission request is issued from the user application 210 to the communication device manager 220. In the transmission request, along with the data indicating a memory area 211 stored with the data at the transmitting end, the virtual ID corresponding to the user application 110 in the node 100 is specified.

Then, the communication device manager 220 outputs a transmission request to the communication device 206. In the transmission request, along with the data indicating the memory area 211 stored with the data at the transmitting end, an I/O address corresponding to the specified virtual ID is specified. The communication device 206 acquires the data from the memory area 211 specified by the transmission request, and transmits the data to the node 100 after specifying the I/O address specified by the transmission request.

In the node 100, the communication device 106 receives the data. At this time, since the I/O address specified by the data transmission is associated with the memory area 111 in the user application 110, the communication device 106 stores the acquired data in the memory area 111 adequately.

The data transmission processing sequence will be described below in detail.

Figure 15:
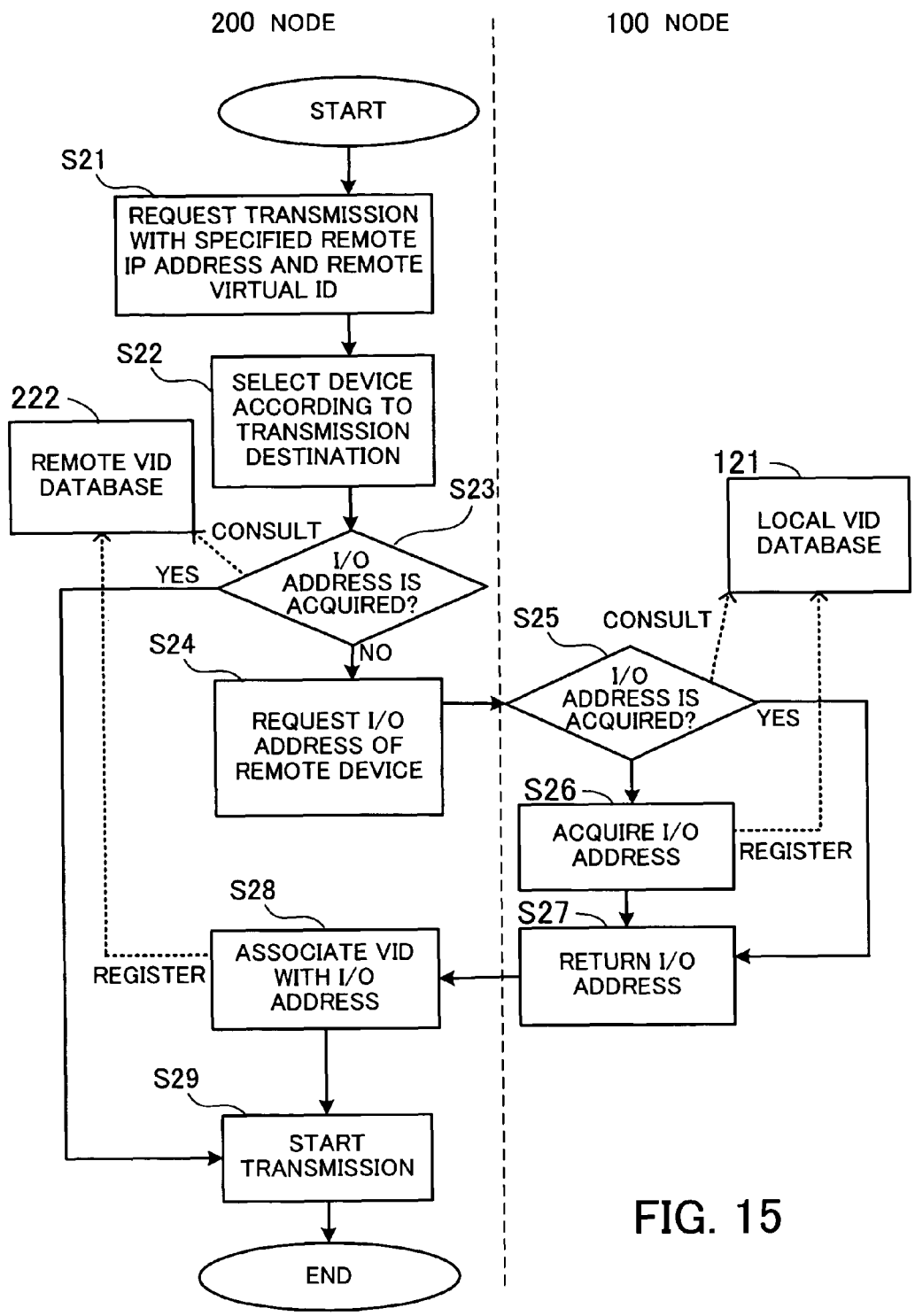
FIG. 15 is a sequence diagram showing a sequence of data transmission processing.

FIG. 15 is a sequence diagram showing the sequence of the data transmission processing. In this example, the node 100 is the receiving end of the data and the node 200 is the transmitting end of the data. The processing shown in FIG. 15 will be described below in accordance with the step numbers.

[Step S21] The user application 210 in the node 200 outputs a transmission request with specified IP address and virtual ID of the remote node to the communication device manager 220.

[Step S22] The communication device manager 220 selects the communication device in the node 100 in accordance with the transmission request.

[Step S23] The communication device manager 220 consults the remote VID database 222 and determines whether an I/O address corresponding to the communication device selected in step S22 has been acquired. When acquired, the processing proceeds to step S29. When not acquired, the processing proceeds to step S24.

[Step S24] The communication device manager 220 outputs an acquisition request (virtual ID resolution request) of an I/O address corresponding to the communication device selected in step S22 to the node 100.

[Step S25] The communication device manager 120 in the node 100 consults the local VID database 121, receives a virtual ID resolution request, and determines whether an I/O address corresponding to the relevant communication device has been acquired. When acquired, the processing proceeds to step S27. When not acquired, the processing proceeds to step S26.

[Step S26] The communication device manager 120 acquires an I/O address corresponding to the relevant communication device. That is, the communication device manager 120 secures an I/O memory area for the communication device in the memory space, and acquires an I/O address. Further, the communication device manager 120 registers the acquired I/O address in the local VID database 121.

[Step S27] The communication device manager 120 responds to the node 200 with the I/O address corresponding to the relevant communication device (virtual ID resolution response).

[Step S28] The communication device manager 220 in the node 200 associates the virtual ID with the I/O address. Specifically, the communication device manager 220 associates the virtual ID indicated by the virtual ID resolution response with the I/O address and registers the virtual ID in the remote VID database 222.

[Step S29] The communication device manager 220 specifies an I/O address corresponding to the communication device in the node 100 selected in step S22, and outputs an RDMA transmission request to the communication device 206 or the communication device 207. Then, the communication device starts RDMA transmission of the data in the memory area 211 of the user application 210 to the specified I/O address.

At this time, the communication device manager 220 causes a use counter provided being associated with the virtual ID of the remote node to increment. The use counter is caused to decrement when the data transmission has been completed. By making reference to the value of the use counter, it is possible to determines whether the I/O address is in use. That is, when the value of the use counter is 1 or more, data transmission using the I/O address is now being carried out.

As described above, by specifying a virtual ID of the remote node from the user application 210, RDMA data transmission can be carried out. As a result, it is not necessary for the user application 210 to pay attention to the communication path.

When an I/O address is acquired by the node 200, the virtual ID relating to the node 100 corresponding to the I/O address is seized by the node 200. That is, while the I/O address is kept reserved, the node 200 can carry out data transmission to the I/O address adequately.

The I/O memory area reserved corresponding to the virtual ID relating to the node 100 is released based on a release request from the node 100. The release request is issued when, for example, the total amount of the plural I/O memory areas, which are reserved for receiving the other data, exceeds a predetermined value, or when the data transmission with the specified relevant I/O memory area is not carried out for a predetermined period of time. To release the I/O memory area, the I/O memory area has to be released in the node 200 reserving the I/O memory area corresponding to the virtual ID.

Figure 16:
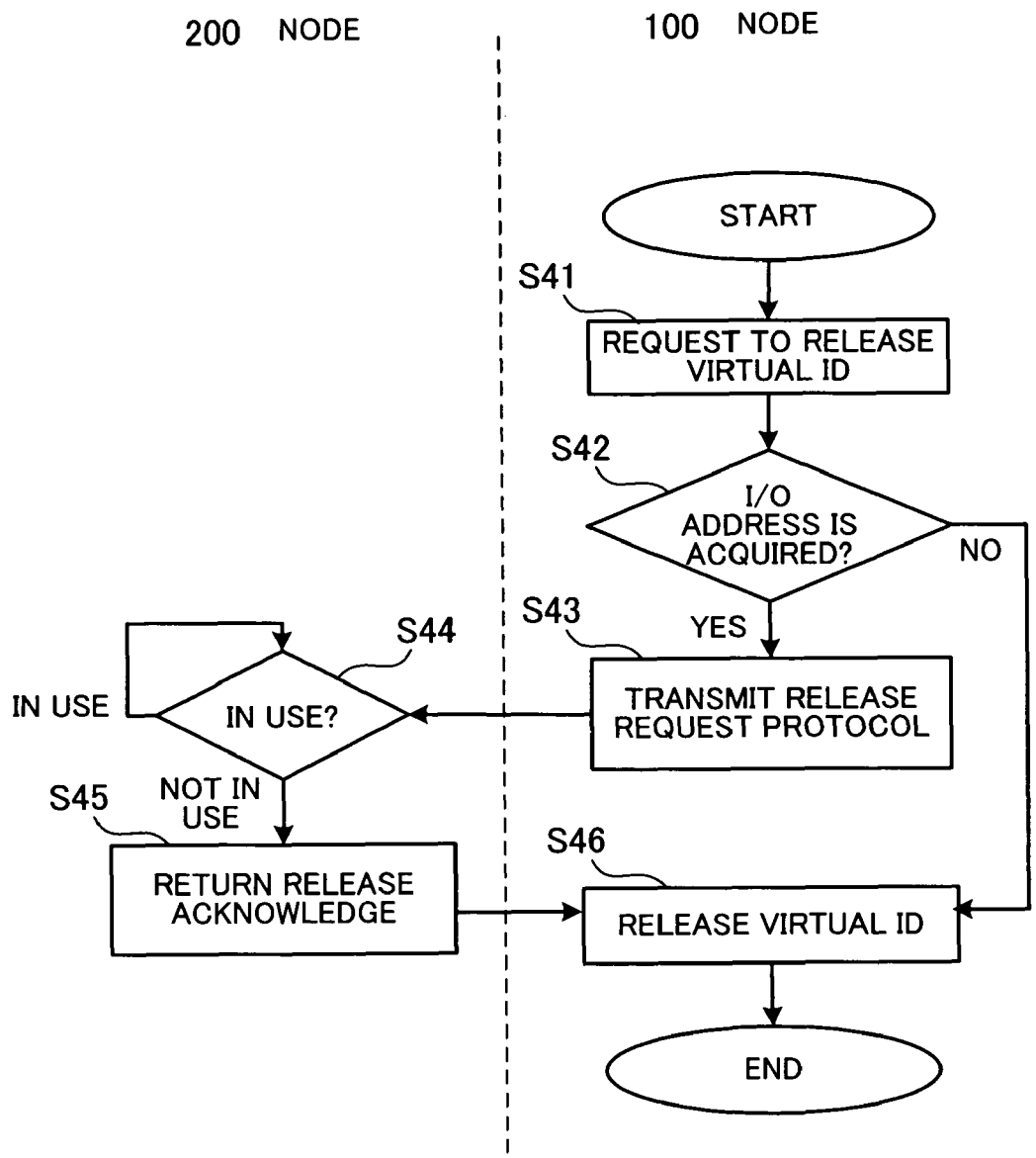
FIG. 16 is a sequence diagram showing a sequence of virtual ID releasing processing.

FIG. 16 is a sequence diagram showing a sequence of a virtual ID releasing processing. The processing shown in FIG. 16 will be described below in accordance with the step numbers.

[Step S41] The user application 110 in the node 100 outputs a release request for a virtual ID to the communication device manager 120.

[Step S42] The communication device manager 120 determines whether the I/O address corresponding to the virtual ID has been acquired by another node. When acquired, the processing proceeds to step S43. When not acquired, the processing proceeds to step S46.

[Step S43] The communication device manager 120 transmits a release request with a specified virtual ID to the node 200.

[Step S44] The communication device manager 220 in the node 200 determines whether the I/O address corresponding to the virtual ID specified by the release request is in use. When in use, step S44 is repeated. When not in use, the processing proceeds to step S45. That is, when the I/O address is in use for data transmission, the processing proceeds to step S45 after the data transmission has been completed.

[Step S45] The communication device manager 220 releases the specified virtual ID, and transmits a release acknowledge to the node 100. To "release a virtual ID" means to delete an I/O address that has been registered in association with that virtual ID.

[Step S46] The communication device manager 120 in the node 100 carries out releasing processing of the virtual ID. Specifically, the communication device manager 120 deletes the I/O address associated with the virtual ID.

Figure 17:
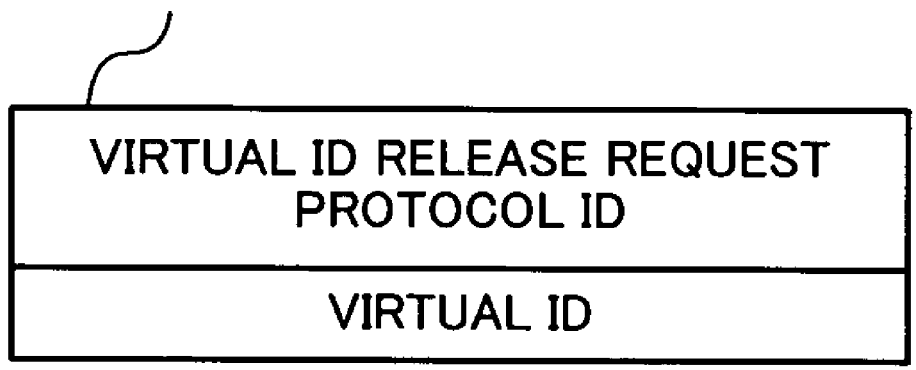
FIG. 17 shows an example of a data structure of a virtual. ID release request.

FIG. 17 shows an example of a data structure of a virtual ID release request. A virtual ID release request 53 includes a virtual ID release request protocol ID indicating that this is a virtual ID release request, and a virtual ID to be released.

Figure 18:
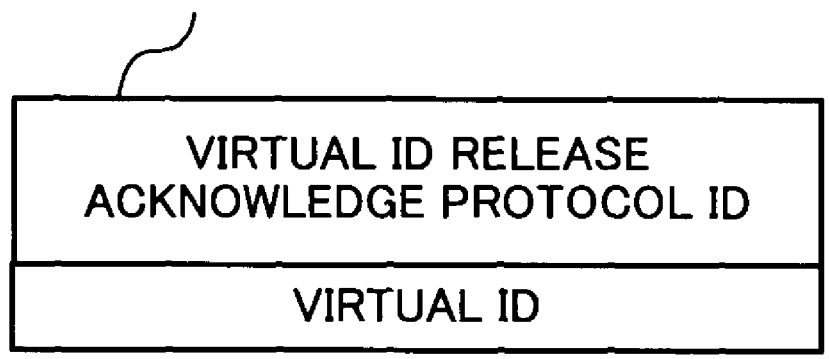
FIG. 18 shows an example of a data structure of a virtual ID release acknowledge.

FIG. 18 is an example of a data structure of a virtual ID release acknowledge. A virtual ID release acknowledge 54 includes a virtual ID release acknowledge protocol ID indicating that this is a virtual ID release acknowledge, and a released virtual ID.

As described above, by releasing the virtual ID, the corresponding I/O memory area is released. As a result, it is possible to prevent the I/O memory area not being used from being seized by a specific node. As a result, the memory space in the node 100 is used efficiently.

Also, in the case where a failure occurs during communication, an I/O address can be acquired again automatically (without depending on the operation of the user application).

Figure 19:
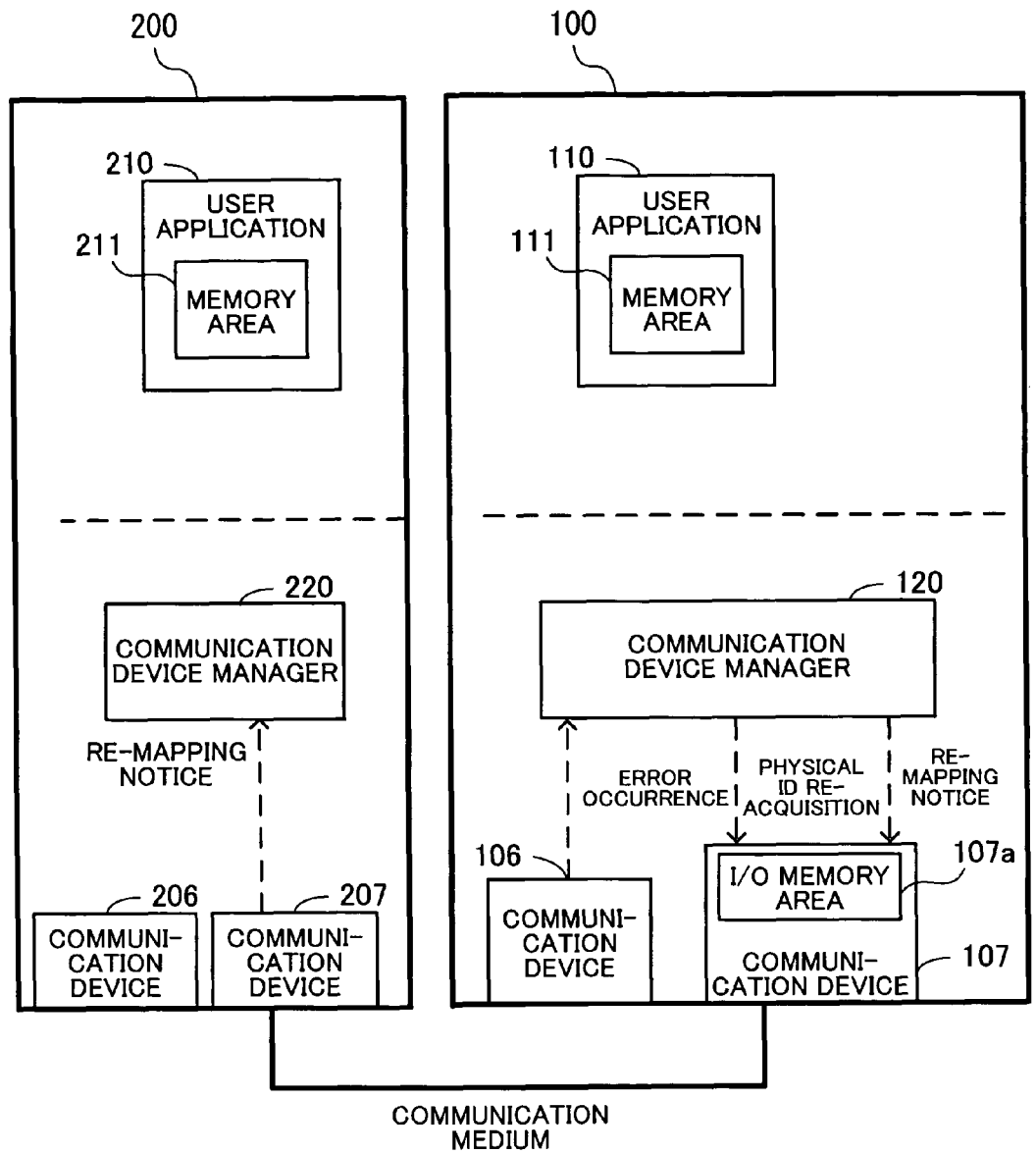
FIG. 19 shows a status of an I/O address re-acquisition.

FIG. 19 shows a status of an I/O address re-acquisition. In the example in FIG. 19, a case where a failure has occurred during data transmission from the communication device 206 to the communication device 106 is assumed.

When an error is detected in the communication device 106, the occurrence of the error is notified from the communication device 106 to the communication device manager 120. Then, the communication device manager 120 acquires the physical ID (I/O address) again.

In the example in FIG. 19, the communication device manager 120 reserves an I/O memory area 107a in the communication device 107 to acquire the I/O address. And the communication device manager 120 transmits a re-mapping notice to the node 200. The re-mapping notice includes a virtual ID of the erroneous communication, a newly acquired I/O address and the device ID of the communication device 107.

In the node 200, the communication device manager 220 receives the re-mapping notice. In accordance with the re-mapping notice, the communication device manager 220 updates the I/O address, device ID and the like, which are registered in association with the virtual ID.

Thus, even when a communication failure has occurred, the status where the data can be transmitted is restored without depending on the operation of the user application. Accordingly, it is not necessary for the user application to have a function of restoring the connection at the occurrence of communication failure. Because of this, the user application can be developed more easily, and the reliability of the user application operated by plural nodes in cooperation with each other is increased.

Next, an example of data transmission from the node 200 to the node 100 will be described below specifically. Here, the environment of the data transmission is described below.

First of all, the environment of the node 200 at the transmitting end is described as below. The IP address of the node 200 is "192.168.1.1." In the memory area 211 of the user application 210, the memory address is "0x100" and the length is "0x100." The ID of the communication device 206 is "A1" and the ID of the communication device 207 is "A2."

The environment of the node 100 at the receiving end is described below. The IP address of the node 100 is "192.168.1.2." In the memory area 111 in the user application 110, the memory address is "0x500" and the length is "0x100." The ID of the communication device 106 is "B1" and the ID of the communication device 107 is "B2."

The sequence of data transmission carried out under the data transmission environment described above will be described below.

Figure 20:
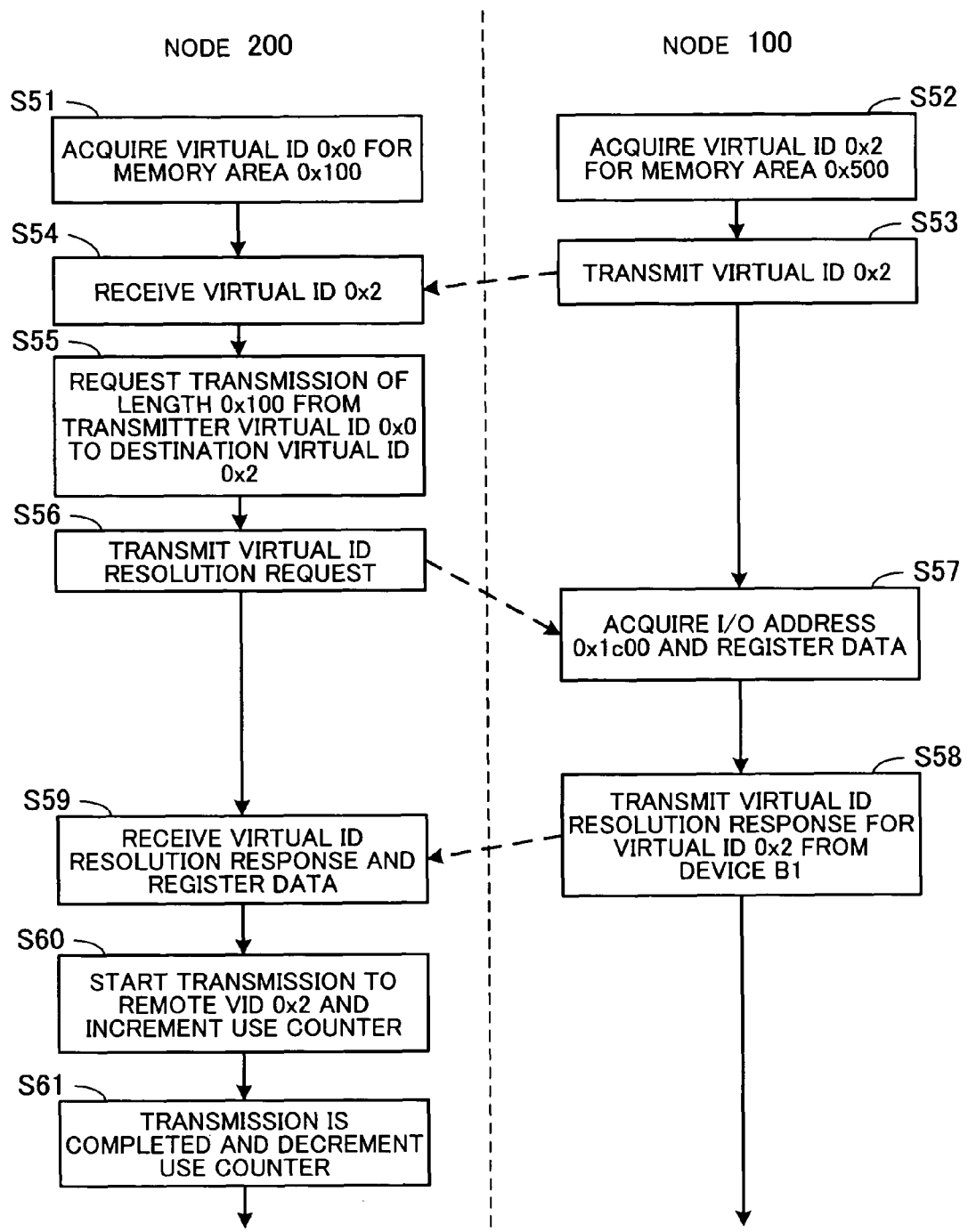
FIG. 20 is a sequence diagram showing a sequence of data transmission.

FIG. 20 is a sequence diagram showing a sequence of data transmission. The processing shown in FIG. 20 will be described below in accordance with the step numbers.

[Step S51] In the node 200, a virtual ID is acquired for the memory area 211. In this example, it is assumed that a virtual ID "0x0" is acquired.

[Step S52] In the node 100, a virtual ID is acquired for the memory area 111. In this example, it is assumed that a virtual ID "0x2" is acquired.

[Step S53] The virtual ID "0x2" is transmitted from the node 100 to the node 200 at the transmitting end.

[Step S54] The node 200 receives the virtual ID "0x2" sent from the node 100 at the receiving end.

[Step S55] In the node 200, the user application 210 issues a transmission request for a length of "0x100" from the virtual ID "0x0" to the virtual ID "0x2" of the node 100.

[Step S56] Since the node 200 does not have the I/O address corresponding to the virtual ID "0x2," the node 200 transmits a virtual ID resolution request to the node 100 via the communication device 206.

[Step S57] In the node 100, upon receipt of the virtual ID resolution request, since the I/O address for the virtual ID "0x2" is not defined, the I/O address "0x1c00" of the communication device 106 is acquired. And in the node, the acquired I/O address is registered in association with the virtual ID "0x2."

[Step S58] The node 100 transmits the virtual ID resolution response for the virtual ID "0x2" to the node 200 via the communication device 106.

[Step S59] The node 200 receives the virtual ID resolution response and registers the data.

[Step S60] In the node 200, the communication device 206 starts transmission for the virtual ID "0x2" of the remote node and causes the use counter to increment.

[Step S61] When the transmission is completed, the node 200 causes the use counter to decrement.

Data transmission is carried out in accordance with the sequence as described above. The transition of the data (local VID database and remote VID database) held by each of the nodes 100 and 200 will be described below in accordance with the progression of the sequence of data transmission.

Figure 21:
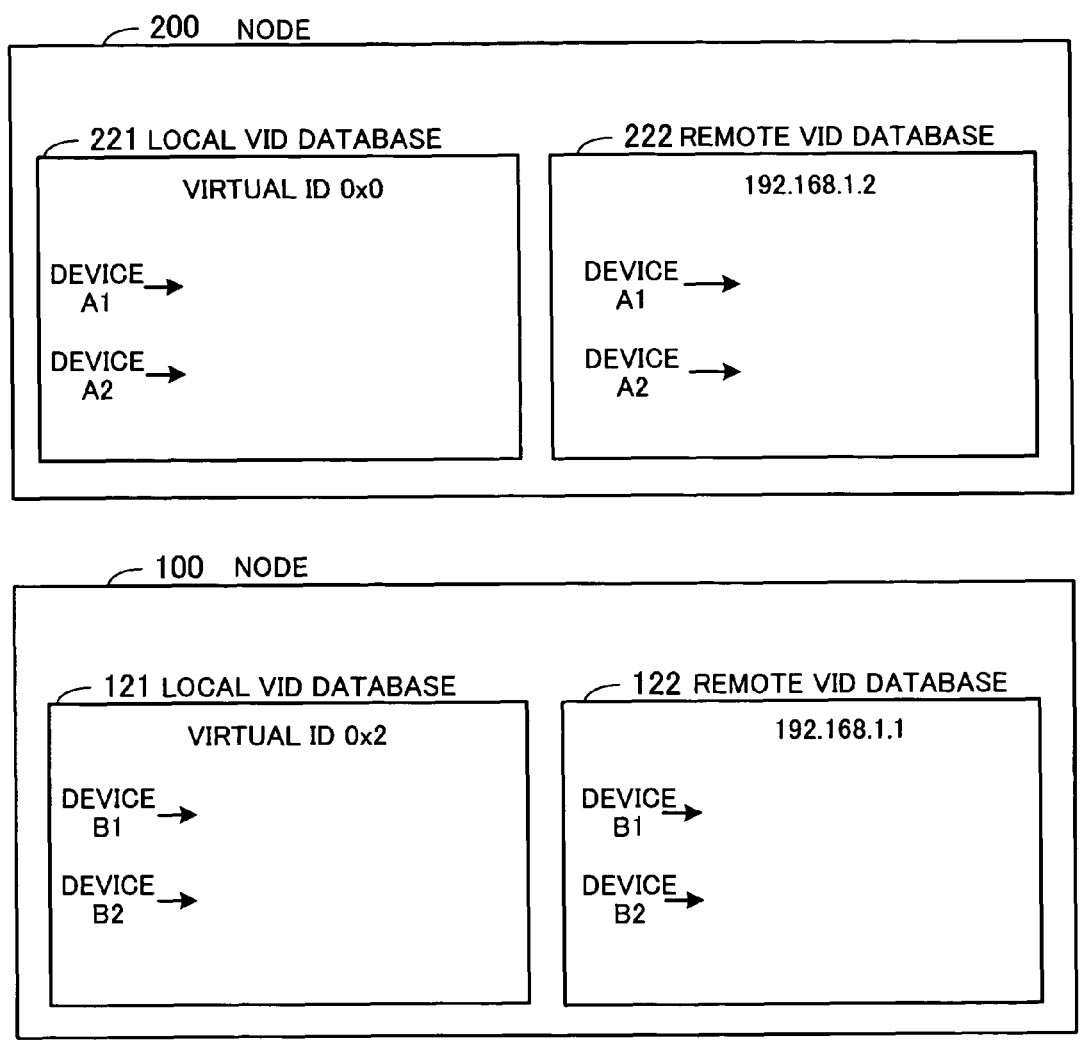
FIG. 21 shows the contents of the data after the virtual ID is acquired.

FIG. 21 shows the contents of the data after the virtual ID has been acquired. In the node 200, since the acquiring processing (step S51) of a virtual ID has been carried out, the virtual ID "0x0" is registered in the local VID database 221. In the node 100, since the acquiring processing (step S52) of a virtual ID has been carried out, the virtual ID "0x2" is registered in the local VID database 121.

After this, when the virtual ID "0x2" of the node 100 is transmitted (step S53), the remote VID database 222 of the node 200 is updated.

Figure 22:
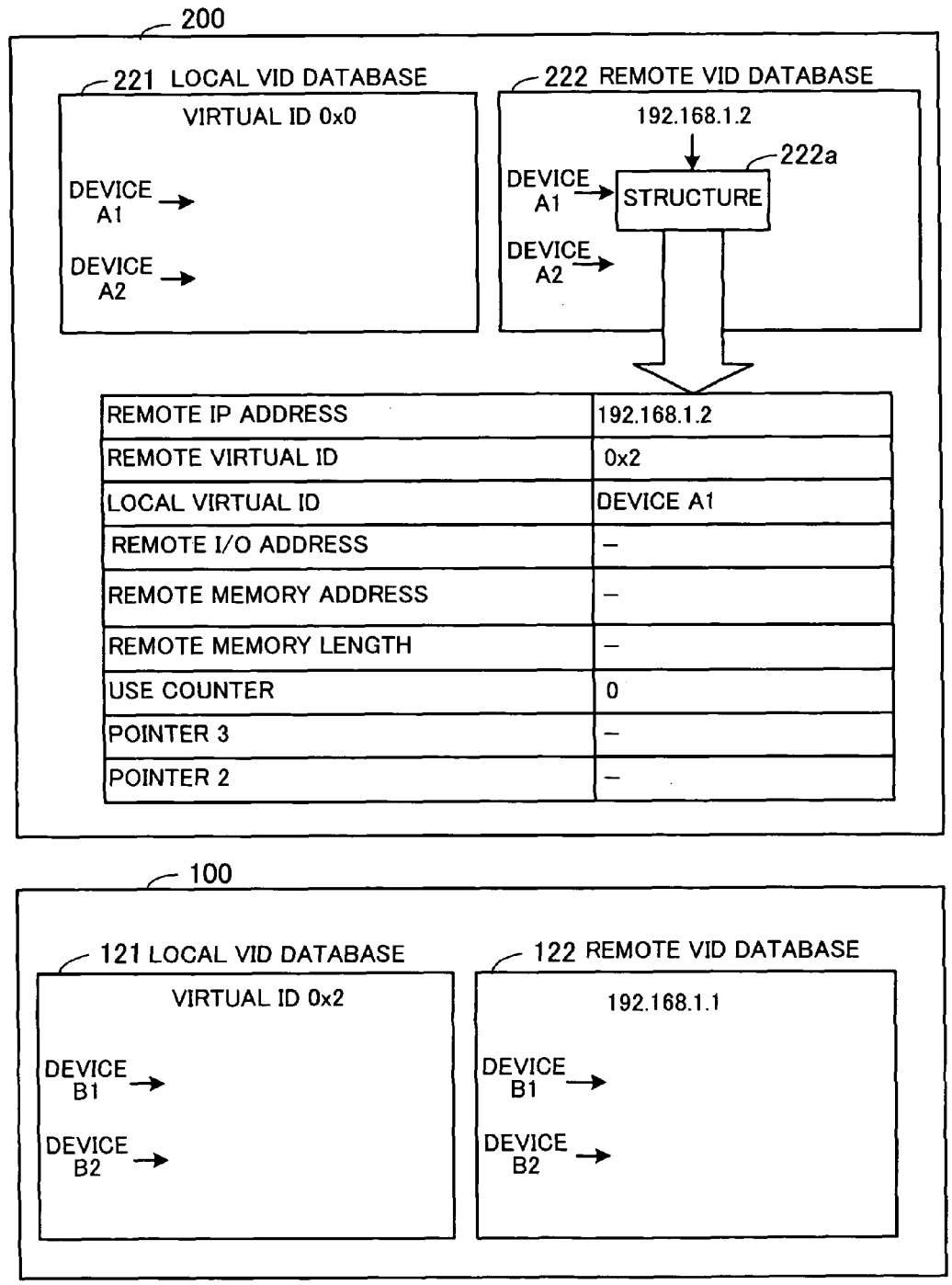
FIG. 22 shows the contents of the data after the virtual. ID is transmitted.

FIG. 22 shows the contents of the data after the virtual ID is transmitted. Since the node 200 has received the virtual ID transmitted from the node 100 to the node 200 (step S54), and a transmission request to the virtual ID has been issued (step S55), a structure 222a is registered in the local VID database 222 of the node 200.

Specifically, the structure 222a is registered in association with the device ID "A1" of the communication device 206 and the IP address "192.168.1.2", of the node 100. In the structure 222a, the remote IP address "192.168.1.2," the remote virtual ID "0x2," the local device ID "A1," and the use counter "0" are set up.

After this, a virtual ID resolution request is issued from the node 200 to the node 100 (step S56).

Figure 23:
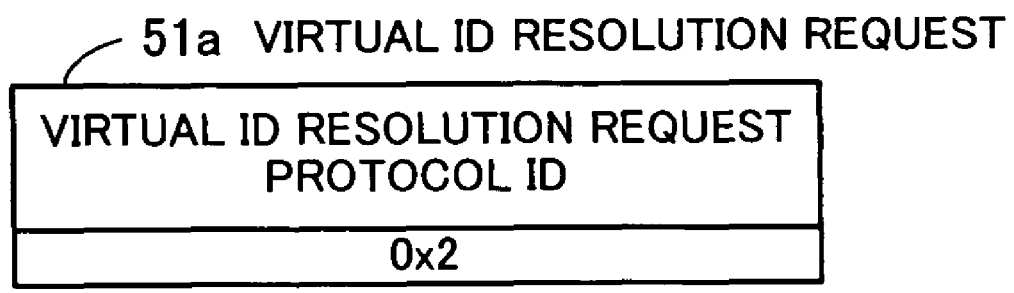
FIG. 23 shows the contents of a virtual ID resolution request.

FIG. 23 shows the contents of a virtual ID resolution request. A virtual ID resolution request 51a includes a virtual ID resolution request protocol ID indicating that this is a virtual ID resolution request and a virtual ID "0x2" of the node 100.

In the node 100 that has received the virtual ID resolution request 51a, an I/O address is acquired (step S57), and the local VID database 121 is updated.

Figure 24:
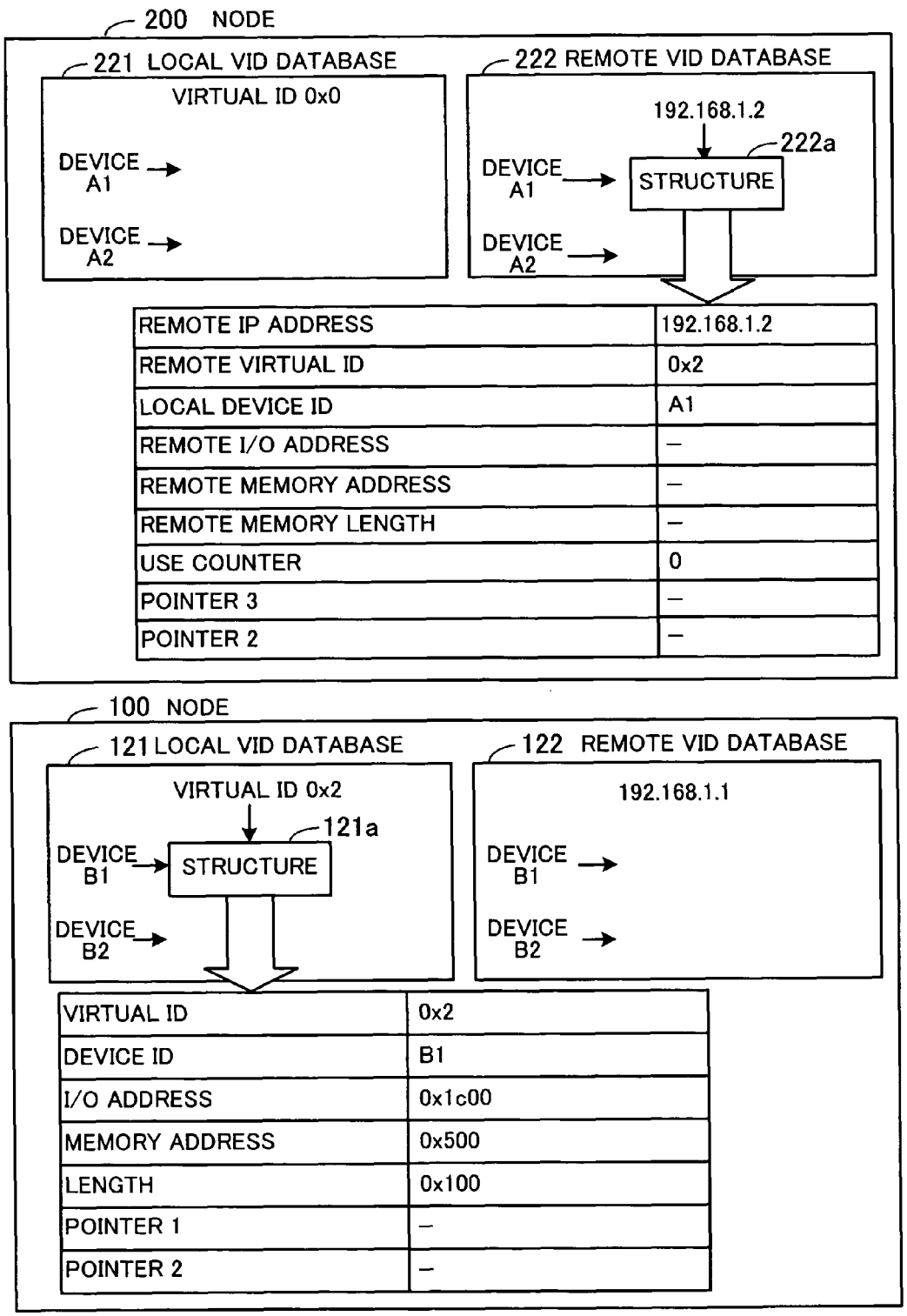
FIG. 24 shows the contents of the data after I/O address is acquired.

FIG. 24 shows the contents of the data after an I/O address has been acquired. In the local VID database 121 of the node 100, a structure 121a is registered. Specifically, the structure 121a is registered in association with the virtual ID "0x2" and the device ID "B1." In the structure 121a, the virtual ID "0x2," the device ID "B1," the I/O address "0x1c00," the memory address "0x500" and the length "0x100" are set up.

After this, a virtual ID resolution response is transmitted from the node 100 to the node 200 (step S58).

Figure 25:
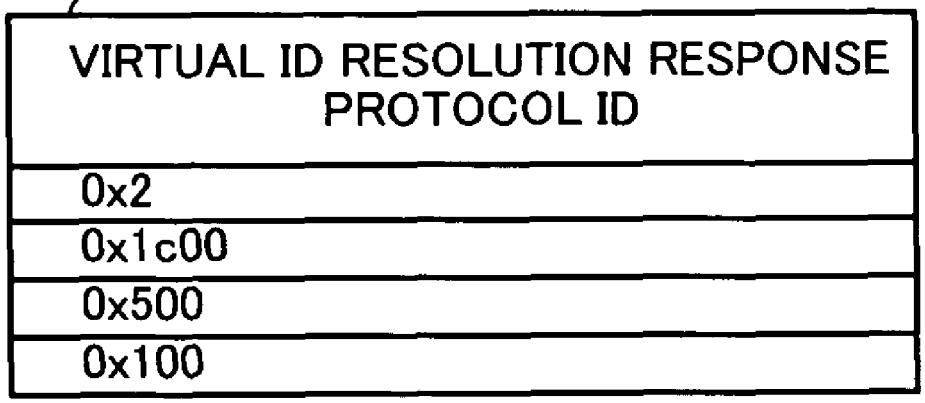
FIG. 25 shows the contents of a virtual ID resolution response.

FIG. 25 shows the contents of a virtual ID resolution response. A virtual ID resolution response 52a includes a virtual ID resolution response protocol ID indicating that this is a virtual ID resolution response, the virtual ID "0x2," the I/O address "0x1c00," the memory address "0x500" and the length "0x100."

In the node 200 that has received the virtual ID resolution response 52a described above, the data included in the virtual ID resolution response 52a are registered in the structure 222a in the remote VID database 222 (step S59).

Figure 26:
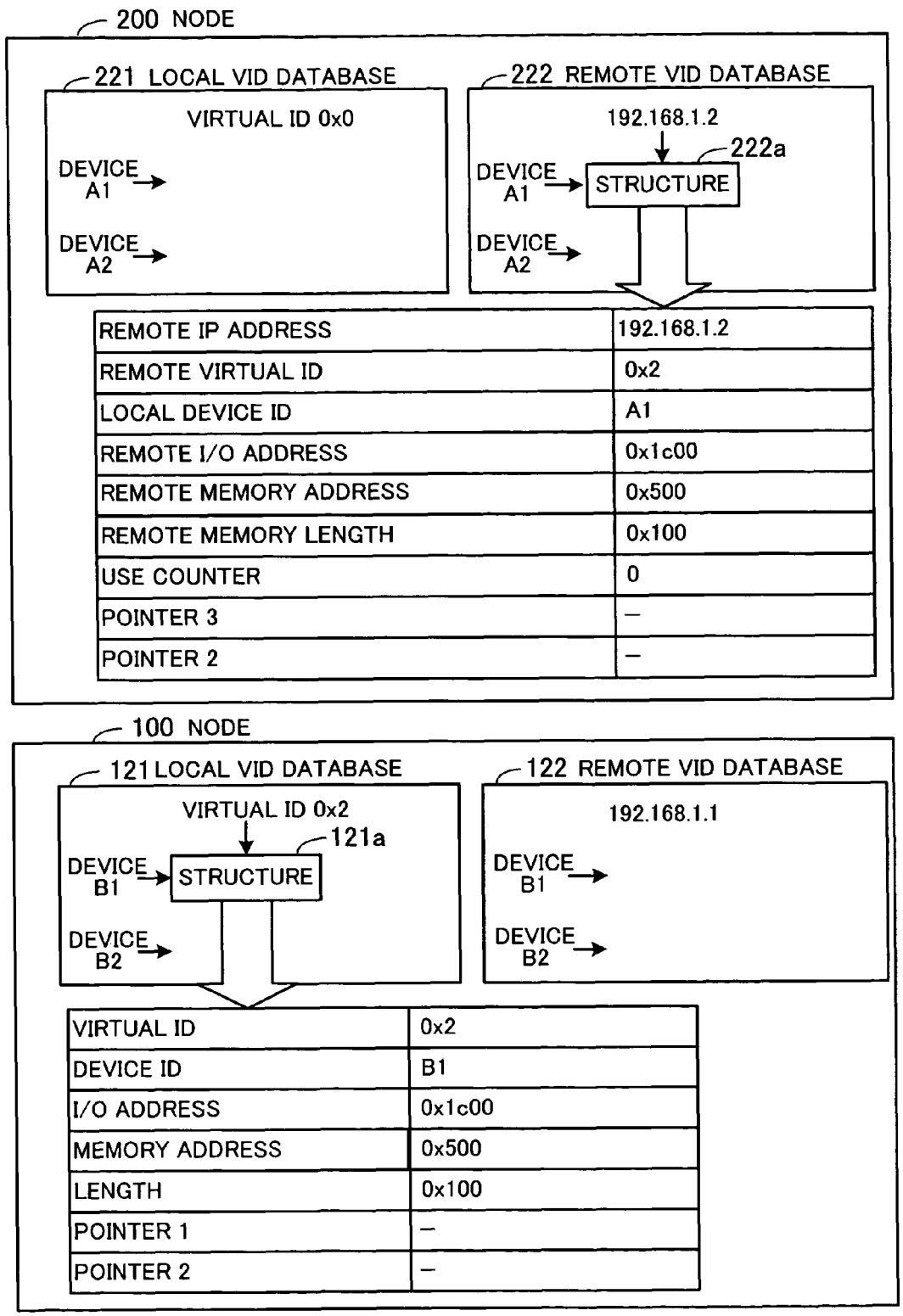
FIG. 26 shows the state of data after receipt of the virtual ID resolution response.

FIG. 26 shows the status of the data after a virtual ID resolution response has been received. Since the virtual ID resolution response 52a is received, in the structure 222a, the remote I/O address "0x1c00," the remote memory address "0x500" and the remote length "0x100" are registered additionally.

In the node 200, by consulting the structure 222a, the I/O address of the node 100 is identified, and RDMA transmission with the specified address is started (step S60). When RDMA transmission starts, the value of the use counter in the structure 222a is updated.

Figure 27:
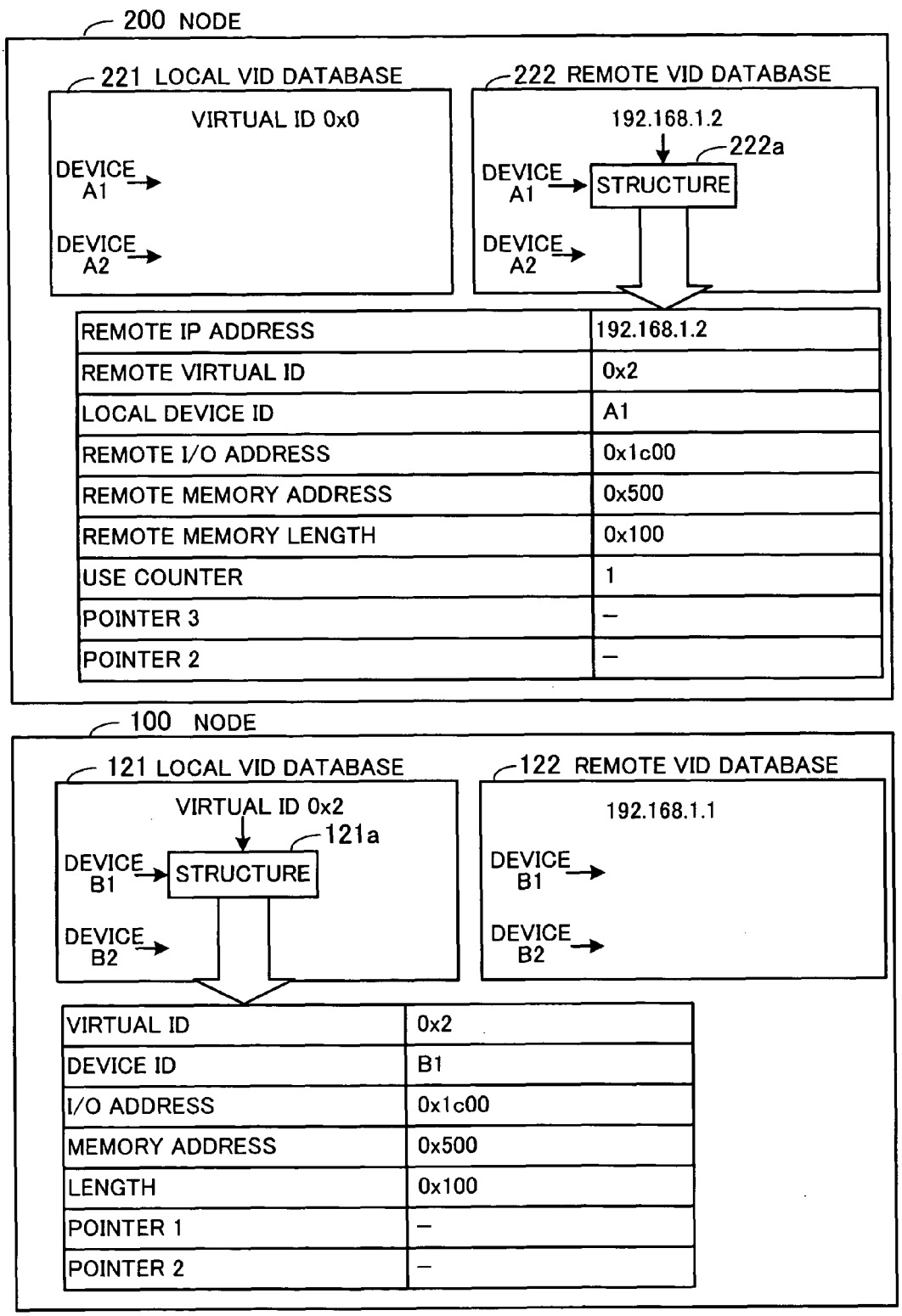
FIG. 27 shows the contents of the data during data transmission.
Figure 28:
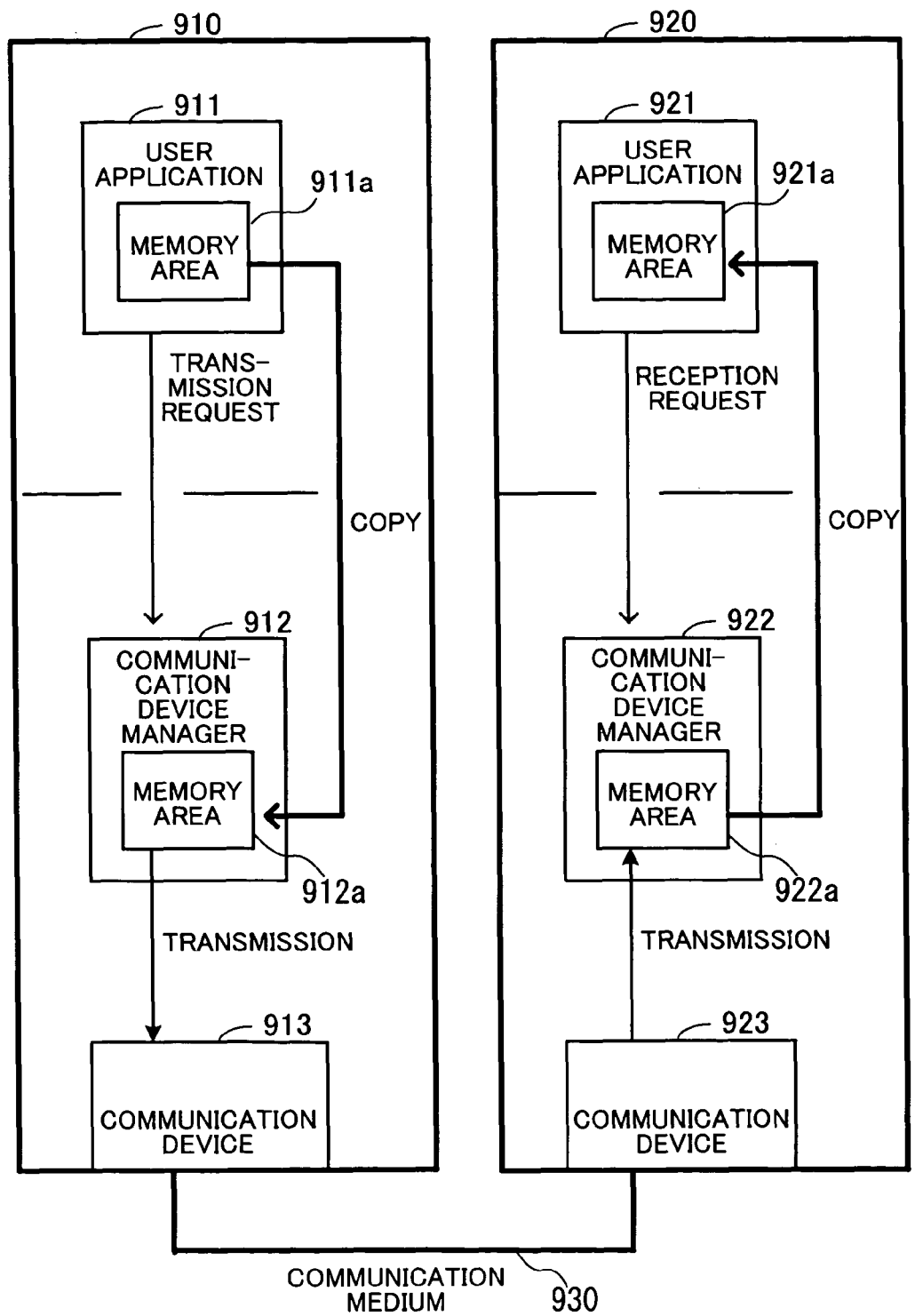
FIG. 28 shows a conventional data transmission method.
Figure 29:
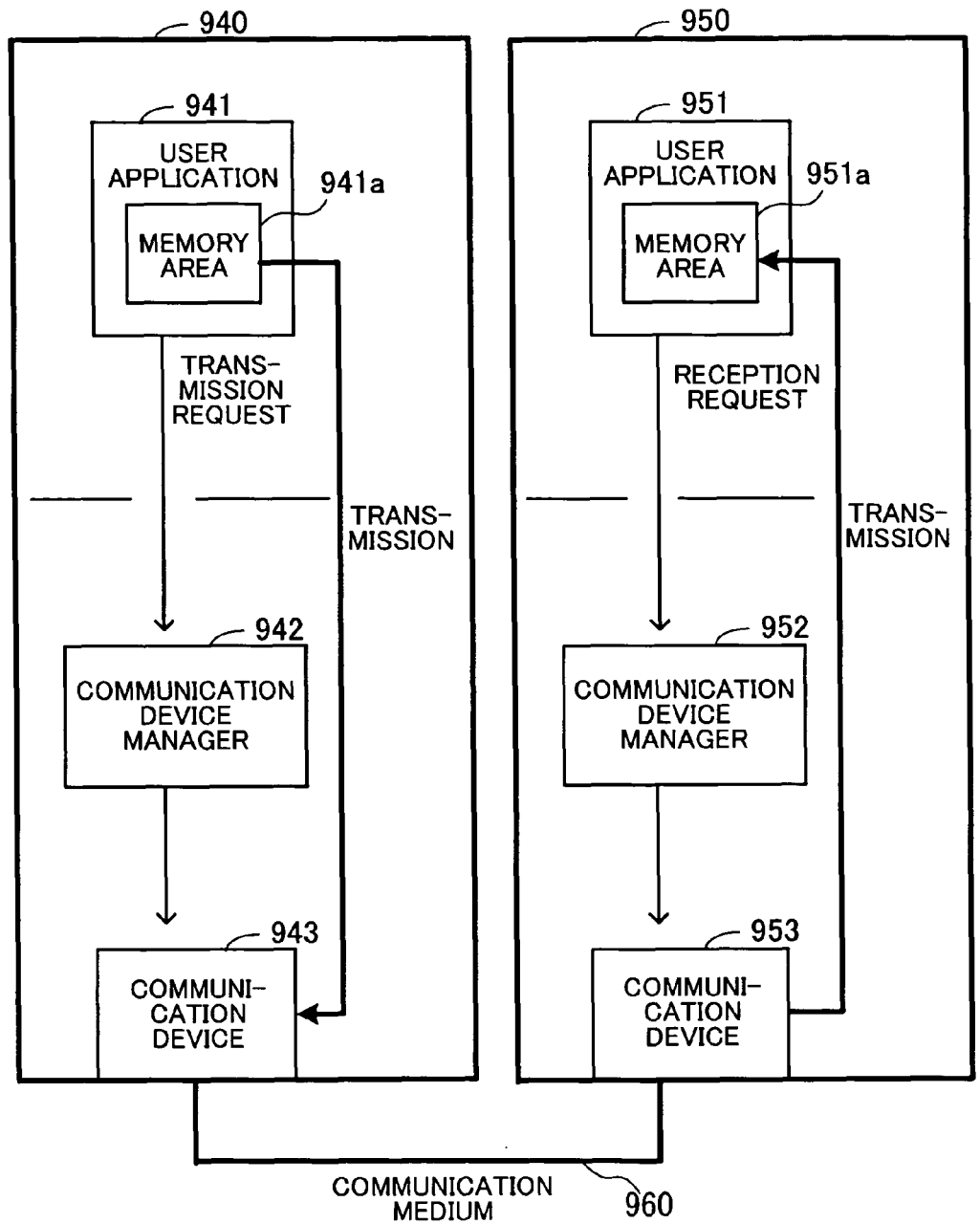
FIG. 29 shows a data transmission method using RDMA.

FIG. 27 shows the contents of the data during data transmission. When data transmission starts, the use counter in the structure 222a in the remote VID database 222 of the node 200 is updated to "1." When data transmission is completed, the value of the use counter is decremented by one.

As described above, when a virtual ID resolution request is received from the node that is going to transmit data, the I/O memory area for RDMA transmission is reserved. Accordingly, it is not necessary for the data receiving end to reserve an I/O memory area corresponding to the remote node beforehand. Because of this, the resources relating to the I/O memory area can be saved.

Further, only by issuing a transmission request for data with a specified virtual ID, the user application can acquire an I/O address corresponding to the virtual ID, and RDMA transmission with the specified I/O address is carried out. Because of this, the user application does not have to pay attention as to whether an I/O address has been reserved. Accordingly, loads in the program development of a user application are reduced.

Furthermore, reservation and release of an I/O memory area in the memory space are managed uniquely by the communication device manager, therefore, the total amount of the I/O memory area can be managed so that the entire system operates efficiently, the use status of the I/O memory area being taken into account.

The above-described processing functions can be achieved by means of computers. In this case, a communication device management program that describes the processing contents of the functions to be possessed by each of the servers is provided. By running out the communication device management program on computers, the above-described functions can be achieved on the computers. The communication device management program describing the processing contents can be stored in a computer-readable storage medium. Computer-readable storage media include a magnetic recording device, an optical disc, a magneto-optical recording medium, a semiconductor memory and the like. Magnetic recording devices include a hard disk device, a flexible disk, a magnetic tape and the like. Optical discs include a DVD (Digital Versatile Disc), a DVD-RAM (Random Access Memory), a CD-ROM (Compact Disc Read Only Memory), a CD-R (Recordable)/RW (Rewritable) and the like. Magneto-optical recording media include an MO (Magneto-Optical disc) and the like.

To distribute the communication device management program, for example, a portable recording medium such as a DVD or a CD-ROM, in which the communication device management program is stored, is put on the market. Also, the communication device management program may be stored in a storage device of a server computer so that the communication device management program can be transmitted to other computers from the server computer via a network.

A computer on which the communication device management program runs stores, for example, the communication device management program stored in a portable recording medium or the communication device management program transmitted from the server computer in a storage device of its own. Then, the computer reads out the communication device management program from the storage device of its own to carry out processes in accordance with the communication device management program. It may also be possible for a computer to read out the communication device management program directly from a portable recording medium to carry out processes in accordance with the communication device management program. Further, it may also be possible for a computer to carry out processes in accordance with the communication device management program each time the program is transmitted from the server computer.

As described above, in the first aspect of the present invention, a virtual ID corresponding to a process is transmitted and upon receipt of a reservation request for a memory area for the virtual ID, a data receiving memory area is reserved. Accordingly, it is not necessary to reserve in advance a data receiving memory area for each remote node, therefore, the memory space can be used effectively.

Further, as described above, in the second aspect of the present invention, when a transmission request with a specified virtual ID is issued from a process, a memory area corresponding to the virtual ID is requested to be reserved and data transmission is carried out with the specified data receiving memory area reserved in advance. Accordingly, it is not necessary to reserve in advance the data receiving memory area in a remote node, therefore, the memory space of the remote node can be used efficiently.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device management method, comprising:
   generating a virtual ID used to specify a memory area for receiving data which is not associated with a memory area and corresponds to a process of acquiring data from a remote node via a network upon receipt of a request from the process;
   transmitting to the remote node the virtual ID corresponding to the process;
   reserving, via the network, a data receiving memory area used to store data by RDMA (Remote Direct Memory Access) of a communication device in a memory space upon receipt of an address acquisition request with a specified virtual ID from the remote node;
   storing, via the network, a record of association between the specified virtual ID and the data receiving memory area in a storage device;
   notifying, via the network, the remote node of a beginning address and a size of the reserved data receiving memory area; and
   when transmission data from the remote node is stored into the reserved data receiving memory area by RDMA, consulting the record stored in the storage device to identify the process corresponding to the data receiving memory area storing the transmission data, and outputting an instruction to the communication device to forward the transmission data stored in the reserved data receiving memory area to a memory area managed by the identified process.

2. A communication device management method comprising:

receiving a virtual ID used to specify a memory area for receiving data by a remote node which is not associated with a memory area and corresponds to a first process in the remote node from the remote node via a network and storing the virtual ID in a storage device, the virtual ID generated by the remote node upon receipt of a request from the first process;

consulting the storage device to determine whether the remote node has reserved a data receiving memory area corresponding to the virtual ID upon receipt of a transmission request from a second process;

transmitting, via the network, a reservation request with the virtual ID for the data receiving memory area used to store data by RDMA (Remote Direct Memory Access) to the remote node when the data receiving memory area has not been reserved;

storing data, via the network, indicating the memory area in the storage device after associating the data with the virtual ID upon receipt of a reservation response indicating a beginning address and a size of the reserved data receiving memory area from the remote node, and storing the address in the storage device; and consulting, via the network, the storage device to identify the beginning address and the size of the data receiving memory area corresponding to the virtual ID specified by the transmission request and, to a communication device, outputting a data transmission instruction to store transmission data stored in a memory area managed by the second process to into the data receiving memory area in the remote node by the RDMA.

3. A communication management apparatus, comprising:
a communication device; and
one or more processors configured to perform a procedure comprising:

generating a virtual ID used to specify a memory area for receiving data which is not associated with a memory area and corresponds to a process of acquiring data from a remote node via a network upon receipt of a request from the process;

transmitting to the remote node the virtual ID corresponding to the process;

reserving, via the network, a data receiving memory area used to store data by RDMA (Remote Direct Memory Access) of the communication device in a memory space upon receipt of an address acquisition request with a specified virtual ID from the remote node;

storing, via the network, a record of association between the specified virtual ID and the data receiving memory area;

notifying, via the network, the remote node of a beginning address and a size of the reserved data receiving memory area; and when transmission data from the remote node is stored into the reserved data receiving memory area by the RDMA, consulting the record stored in the storage device to identify the process corresponding to the data receiving memory area storing the transmission data, and outputting an instruction to the communication device to forward the transmission data stored in the reserved data receiving memory area to a memory area managed by the identified process.

4. A communication management apparatus for carrying out data transmission to a remote node, comprising:
a communication device; and
one or more processors configured to perform a procedure comprising:

receiving a virtual ID used to specify a memory area for receiving data by a remote node which is not associated with a memory area and corresponds to a first process in the remote node from the remote node via a network and storing the virtual ID in a storage device, the virtual ID generated by the remote node upon receipt of a request from the first process;

consulting the storage device to determine whether the remote node has reserved a data receiving memory area corresponding to the virtual ID upon receipt of a transmission request from a second process;

transmitting, via the network, a reservation request with the virtual ID for the data receiving memory area used to store data by RDMA (Remote Direct Memory Access) to the remote node when the data receiving memory area has not been reserved;

storing, via the network, data indicating the memory area in the storage device after associating the data with the virtual ID upon receipt of a reservation response indicating a beginning address and a size of the reserved data receiving memory area from the remote node; and consulting, via the network, the storage device to identify the beginning address and the size of the data receiving memory area corresponding to the virtual ID specified by the transmission request and, to the communication device, outputting a data transmission instruction to store transmission data stored in a memory area managed by the second process into the data receiving memory area in the remote node by the RDMA.

5. A non-transitory computer-readable storage medium storing a communication device management program, the program causing a computer to perform a method, the method comprising:

generating a virtual ID used to specify a memory area for receiving data which is not associated with a memory area and corresponds to a process of acquiring data from a remote node via a network upon receipt of a request from the process;

transmitting to the remote node the virtual ID corresponding to the process;

reserving, via the network, a data receiving memory area used to store data by RDMA (Remote Direct Memory Access) of a communication device in a memory space upon receipt of an address acquisition request with a specified virtual ID from the remote node;

storing, via the network, a record of association between the specified virtual ID and the data receiving memory area in a storage device;

notifying, via the network, the remote node of a beginning address and a size of the reserved data receiving memory area; and when transmission data from the remote node is stored into the reserved data receiving memory area by the RDMA, consulting the record stored in the storage device to identify the process corresponding to the data receiving memory area storing the transmission data, and outputting an instruction to the communication device to forward the transmission data stored in the reserved data receiving memory area to a memory area managed by the identified process.

6. A non-transitory computer-readable storage medium storing a communication device management program, the program causing a computer to perform a method, the method comprising:
- receiving a virtual ID used to specify a memory area for receiving data by a remote node which is not associated with a memory area and corresponds to a first process in the remote node from the remote node via a network and storing the virtual ID in a storage device, the virtual ID generated by the remote node upon receipt of a request from the first process;
- consulting the storage device to determine whether the remote node has reserved a data receiving memory area corresponding to the virtual ID upon receipt of a transmission request from a second process;
- transmitting, via the network, a reservation request with the virtual ID for the data receiving memory area used to store data by RDMA (Remote Direct Memory Access) to the remote node when the data receiving memory area has not been reserved;
- storing, via the network, data indicating the memory area in the storage device after associating the data with the virtual ID upon receipt of a reservation response indicating a beginning address and a size of the reserved data receiving memory area from the remote node, and storing the address in the storage device; and
- consulting, via the network, the storage device to identify the beginning address and the size of the data receiving memory area corresponding to the virtual ID specified by the transmission request and, to a communication device, outputting a data transmission instruction to store transmission data stored in a memory area managed by the second process into the data receiving memory area in the remote node by the RDMA.

7. The non-transitory computer-readable storage medium according to claim 5, wherein the computer-executed process further comprising releasing the data receiving memory area not in use for data transmission.

8. The non-transitory computer-readable storage medium according to claim 7, wherein the releasing the data receiving memory area comprising:
- transmitting a release request for the data receiving memory area associated with the virtual ID to the remote node; and
- upon receipt of an acknowledge response corresponding to the release request, deleting the association between the virtual ID and the data receiving memory area stored in the storage device.

9. The non-transitory computer-readable storage medium according to claim 5, wherein the computer-executed process further comprising:
- reserving the data receiving memory area again in the memory space when an occurrence of error is detected during data transmission using the data receiving memory area reserved in the communication device.

10. The non-transitory computer-readable storage medium according to claim 6, wherein the computer-executed process further comprising:
- in response to a release request from the remote node, returning a release acknowledge to the remote node upon completion of data transmission to the data receiving memory area.

\* \* \* \* \*